US012493644B2

United States Patent
Li et al.

(10) Patent No.: US 12,493,644 B2
(45) Date of Patent: Dec. 9, 2025

(54) TEXT CATEGORIZATION METHOD AND APPARATUS

(71) Applicant: MaShang Consumer Finance Co., Ltd., Chongqing (CN)

(72) Inventors: Changlin Li, Chongqing (CN); Bing Xiao, Chongqing (CN); Lei Cao, Chongqing (CN); Qishuai Luo, Chongqing (CN)

(73) Assignee: MASHANG CONSUMER FINANCE CO., LTD., Chongqing (CN)

( * ) Notice: Subject to any disclaimer, the term of this patent is extended or adjusted under 35 U.S.C. 154(b) by 0 days.

(21) Appl. No.: 18/782,948

(22) Filed: Jul. 24, 2024

(65) Prior Publication Data
US 2024/0378227 A1    Nov. 14, 2024

(30) Foreign Application Priority Data
Jul. 25, 2023  (CN) .......................... 202310923697.9

(51) Int. Cl.
| | | |
|---|---|---|
| G06F 16/30 | (2019.01) | |
| G06F 16/334 | (2025.01) | |
| G06F 16/35 | (2019.01) | |
| G06F 16/353 | (2025.01) | |
| G06F 16/901 | (2019.01) | |

(Continued)

(52) U.S. Cl.
CPC ........ *G06F 16/353* (2019.01); *G06F 16/3346* (2019.01); *G06F 16/35* (2019.01); *G06F 16/9027* (2019.01); *G06F 17/18* (2013.01); *G06F 18/2321* (2023.01)

(58) Field of Classification Search
CPC .... G06F 16/3346; G06F 16/35; G06F 16/353; G06F 16/9027; G06F 17/18; G06F 18/2321
See application file for complete search history.

(56) References Cited

U.S. PATENT DOCUMENTS

| | | | | |
|---|---|---|---|---|
| 10,254,953 | B2 * | 4/2019 | Durga | ................. G06F 3/04883 |
| 2019/0164245 | A1 * | 5/2019 | Takacs | ............... G06Q 30/0205 |

FOREIGN PATENT DOCUMENTS

| | | | | |
|---|---|---|---|---|
| WO | WO-2022126810 A1 * | 6/2022 | ........... G06F 18/213 |

OTHER PUBLICATIONS

English translation of WO-2022126810-A1 (Year: 2022).*

* cited by examiner

*Primary Examiner* — Diedra McQuitery
(74) *Attorney, Agent, or Firm* — Davis Wright Tremaine LLP

(57) ABSTRACT

An embodiment of the present application provides a text categorization method and apparatus, after obtaining a first text set, performing multiple clustering on the texts in the plurality of text pairs, and obtaining a second text set in each clustering; and for each text pair, calculating a clustering probability that all the texts in the text pair are clustered into the same second text set in the multiple clustering; and then categorizing the first text set into a plurality of third text sets based on the clustering probability of each text pair; in this way, a preliminary clustering is performed on the to-be-categorized texts, and then an accurate categorization is performed in combination with a preliminary clustering result to obtain a final text categorization result, not directly taking the text clustering result as the final text categorization result, which can improve the accuracy of text categorization.

20 Claims, 8 Drawing Sheets

(51) Int. Cl.
*G06F 17/18* (2006.01)
*G06F 18/2321* (2023.01)

TEXT CATEGORIZATION METHOD AND APPARATUS

This application claims priority to Chinese Patent Application No. 202310923697.9, filed on Jul. 25, 2023, which is hereby incorporated herein by reference in its entirety.

TECHNICAL FIELD

The present application relates to a technical field of text data processing, and in particular to a text categorization method and apparatus.

BACKGROUND

At present, with the rapid development of Internet technology, a large amount of text data will be generated in a certain business processing process, and at the same time, in some specific application scenarios, it is necessary to categorize a large amount of text data, for example, for an intelligent customer service system, in order to improve the response efficiency of the intelligent customer service, it is possible to reply to a plurality of similar question statements with the same standard reply statement, therefore, it is necessary to categorize the user's question statements in the historical dialogue text, and categorize the similar question statements into the same text subset. For the process of text categorization, under normal conditions, a plurality of to-be-categorized texts are clustered into a plurality of clusters using a preset clustering method, and each of the clusters is determined to be a text categorization subset, however, if the text clustering result is directly used as a final categorization result, the limitation of the clustering accuracy of the preset clustering method results in low accuracy of text categorization.

SUMMARY

The purpose of an embodiment of the present application is to provide a text categorization method and apparatus that can improve the accuracy of text categorization.

In order to achieve the above technical solution, embodiments of the present application are implemented as follows:

In a first aspect, an embodiment of the present application provides a text categorization method, the method includes:
  obtaining a first text set, wherein the first text set comprise a plurality of text pairs, and each text pair comprises at least one text;
  performing multiple clustering on the texts in the plurality of text pairs, and obtaining a second text set in each clustering;
  for each text pair, calculating a clustering probability that all the texts in the text pair are clustered into the same second text set in the multiple clustering;
  categorizing the first text set into a plurality of third text sets based on the clustering probability of each text pair.

In a second aspect, an embodiment of the present application provides a text categorization apparatus, the apparatus includes:
  a text obtaining module, configured to obtain a first text set, where the first text set includes a plurality of text pairs, and each text pair includes at least one text;
  a text clustering module, configured to perform multiple clustering on the texts in the plurality of text pairs, and obtaining a second text set in each clustering;
  a statistical result determination module, configured to, for each text pair, calculate a clustering probability that all the texts in the text pair are clustered into the same second text set in the multiple clustering;
  a text categorization module, configured to categorize the first text set into a plurality of third text sets based on the clustering probability of each text pair.

In a third aspect, an embodiment of the present application provides an electronic device, the device includes:
  a processor; and a memory, arranged to store computer executable instructions, where the executable instructions are configured to be executed by the processor, the executable instructions are used to perform steps in the method as described in the first aspect.

In a fourth aspect, an embodiment of the present application provides a computer readable storage medium, the storage medium is configured to store computer executable instructions, the executable instructions enable a computer to perform steps in the method as described in the first aspect.

In an embodiment of the present application, after obtaining a first text set, performing multiple clustering on the texts in the plurality of text pairs, and obtaining a second text set in each clustering; and for each text pair, calculating a clustering probability that all the texts in the text pair are clustered into the same second text set in the multiple clustering; and then categorizing the first text set into a plurality of third text sets based on the clustering probability of each text pair; it can be seen that performing a preliminary clustering on the to-be-categorized texts, and then performing an accurate categorization in combination with a preliminary clustering result to obtain a final text categorization result, i.e., the process of categorizing a plurality of to-be-categorized texts into a plurality of subsets involves two text processing stages, namely, the text preliminary clustering and the text accurate categorization, not directly taking the text clustering result as the final text categorization result, but first determining the text clustering statistical result based on the text clustering result, and then performing the text categorization based on the text clustering statistical result, which can improve the accuracy of text categorization.

BRIEF DESCRIPTION OF DRAWINGS

In order to more clearly illustrate the technical solutions in the embodiments of the present application or the related art, the accompanying drawings to be used in the description of the embodiments or related art will be briefly introduced below. Obviously, the accompanying drawings in the following description are only some of the embodiments described in one or more embodiments of the present application. For those of ordinary skilled in the art, other accompanying drawings can be obtained based on these accompanying drawings without creative labor.

DESCRIPTION OF EMBODIMENTS

Figure 1:
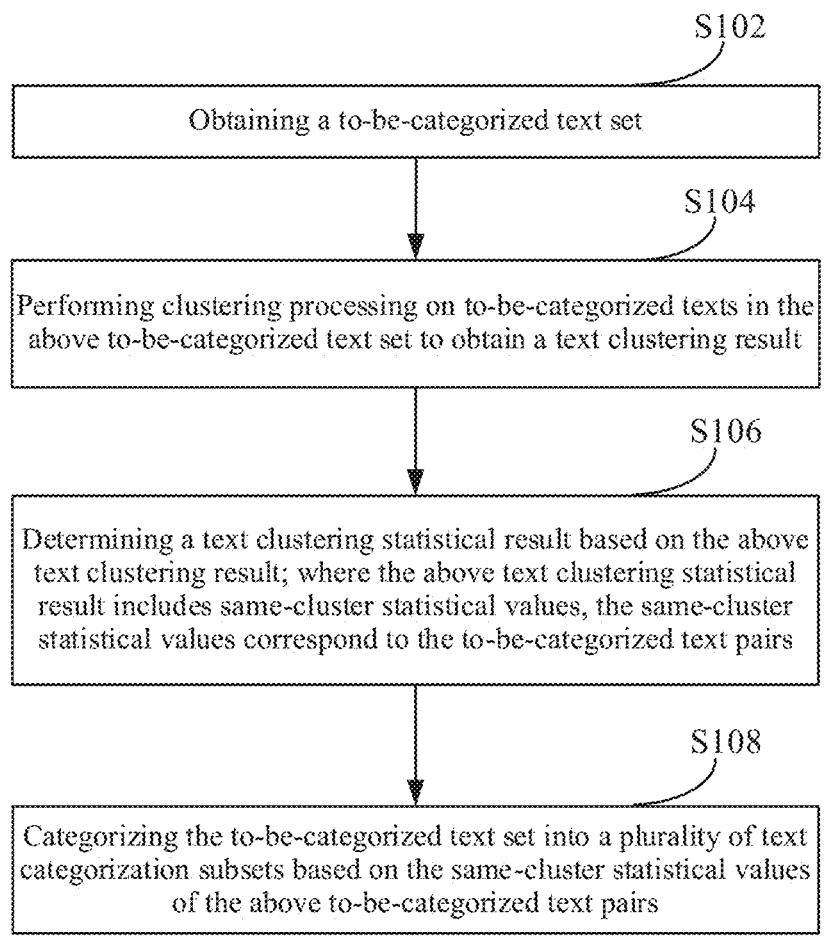
FIG. 1 is a first schematic flowchart of a text categorization method provided in an embodiment of the present application.

In order to enable those skilled in the art to better understand one or more embodiments of the technical solutions in the present application, the technical solutions in the embodiments of the present application will be clearly and completely described below in conjunction with the accompanying drawings in the embodiments of the present application, and it is clear that the described embodiments are only part of the embodiments of one or more embodiments of the present application and not all of the embodiments. Based on one or more of the embodiments in the present application, all other embodiments obtained by those of ordinary skilled in the art without creative labor should fall within the protection scope of the present application.

It is noted that one or more embodiments and features in the embodiments in the present application can be combined with each other in the absence of conflict. Embodiments of the present application will be described in detail below with reference to the accompanying drawings and in conjunction with embodiments.

One or more embodiments of the present application provide a text categorization method and apparatus, considering that if a plurality of text clusters obtained by using a preset text clustering algorithm are directly used as a final text categorization result, there is bound to be an influence by the clustering accuracy of the clustering algorithm, resulting in a low accuracy of the text categorization; considering also that if a text categorization model is used to categorize a plurality of to-be-categorized texts, then it is bound that a neural network model needs to be pre-trained as a text categorization model, which not only takes a long time to train the model, but also affects the accuracy of the selection of the model's training samples and the parameter training accuracy of the text categorization model, thereby affecting the accuracy of text categorization. Based on the above problems, the present technical solution uses a preset clustering method to perform a preliminary clustering on n to-be-categorized texts, and then perform an accurate categorization in combination with a preliminary clustering result to obtain a final text categorization result, i.e., the process of categorizing the n texts into a plurality of subsets involves two text processing stages, namely, the text preliminary clustering and the text accurate categorization, not directly taking the text clustering result as the final text categorization result, but first determining the text clustering statistical result based on the text clustering result, and then performing the text categorization based on the text clustering statistical result, which can improve the accuracy of text categorization. Further, in order to improve the accuracy of the text clustering statistical result, the above text clustering result may include text clustering sub-results obtained from a plurality of text clustering operations, so that since the text clustering statistical result is obtained based on the text clustering sub-results of the plurality of text clustering operations, the accuracy of the text clustering statistical result is ensured, and the accuracy of the text categorization based on the text clustering statistical result can be further improved. In addition, in the whole text categorization process, it mainly involves two text processing stages: clustering first and then categorization, i.e., performing a rough categorization with the help of the preset clustering method, and then performing an accurate categorization with the help of the statistical result based on the cluster results of multiple text clustering, without the need to use any neural network model, thus, omitting the process of model training and without the need to obtain a large number of model training samples, which is able to take into account both the efficiency and accuracy of text categorization.

FIG. 1 is a first schematic flowchart of a text categorization method provided in one or more embodiments of the present application, the method of FIG. 1 may be performed by an electronic device, and the electronic device may be a terminal device or a designated server; as shown in FIG. 1, the method includes at least the following steps:

S102, obtaining a to-be-categorized text set.

Specifically, the to-be-categorized text set may include n to-be-categorized texts, n is an integer greater than 2; the to-be-categorized text may be a single text statement or multiple text statements, and the to-be-categorized text is text data generated in the process of the preset business, for example, the to-be-categorized text includes a user question statement extracted from the interactive data, which may be generated in the process of a voice call between an agent terminal and a user terminal for a preset push service; the interactive data may also be generated in the process of sending an instant communication message between an intelligent customer service and the user terminal for a preset consulting service.

S104, performing clustering processing on to-be-categorized texts in the above to-be-categorized text set to obtain a text clustering result.

In some example embodiments, the above text clustering result may be obtained by performing one clustering operation on the n to-be-categorized texts; however, in order to improve the accuracy of the subsequent text clustering statistical result, so as to further improve the accuracy of the final text categorization, in some other example embodiments, the above text clustering result may be obtained by performing a plurality of clustering operations on the n to-be-categorized texts, and correspondingly, the above text clustering result includes N text clustering sub-results, each text clustering sub-result is obtained by one text clustering operation, and N is an integer greater than 1.

Specifically, for each text clustering operation, n to-be-categorized texts are clustered into a plurality of text clusters, and each text cluster includes to-be-categorized texts with the same or similar semantics, i.e., the above text clustering sub-results include a plurality of text clusters, and thus, if N text clustering operations are performed, N text clustering sub-results are obtained; furthermore, considering that the larger the value of N, the higher the accuracy of the determined text clustering statistical result, therefore, the minimum value of N can be set, for example, it is required that the number of seed points (N×m) selected for N text clustering is not less than $\frac{1}{50}$ of the total number of texts n, i.e., the value of N can be greater than or equal to $$ROUNDUP\left(\frac{N}{50*m}\right),$$

ROUNDUP indicates rounding upwards, and m indicates the number of seed points selected for each text clustering operation (i.e., K-value of the cluster center).

In addition, in the text clustering process, the clustering processing is usually based on the feature vectors of the to-be-categorized texts, so it is necessary to convert the to-be-categorized texts into feature vectors and obtain the text feature vector of each to-be-categorized text.

Specifically, the preset clustering method used for each text clustering operation may be any existing clustering method, may be a K-means clustering method, or may be other clustering methods; taking the above preset clustering method as the K-means clustering method as an example, correspondingly, the process of determining the above text clustering result, specifically including:

- determining a number m of text cluster centers, where m is an integer greater than 1, i.e., the K-value of the cluster center required in the K-means clustering method is equal to the value of m;
- for each text clustering operation, performing the clustering processing on the above n to-be-categorized texts using the K-means clustering method to obtain m text clusters; determining a text clustering sub-result corresponding to this text clustering operation based on the above m text clusters;
- obtaining the text clustering result based on the text clustering sub-results of N text clustering operations.

It should be noted that the specific process of using the K-means clustering method to obtain m text clusters can be seen in the existing K-means clustering algorithm, and will not be repeated herein; in addition, in the process of performing clustering processing on n to-be-categorized texts, other clustering methods can be used, for example, a density-based clustering method, such as a DBSCAN clustering algorithm, and also such as, a hierarchical clustering algorithm, a BIRCH clustering algorithm.

In specific implementation, considering that the above number m of text cluster centers may be a human empirical value, however, in order to improve the accuracy of the text clustering sub-results, the above number m of text cluster centers may be determined in either of the following two ways, which specifically include:

(1) Determining the number m of text cluster centers based on a number of preset text categories.

Specifically, in a case where the number of preset text categories is known, the number of preset text categories can be directly determined as the number m of text cluster centers, or the sum of the number of preset text categories and the preset compensation number can be determined as the number m of text cluster centers, i.e., for each text clustering operation, the number of obtained text clusters is greater than the number of preset text categories, that is to say, the n to-be-categorized texts are clustered into more text clusters.

(2) For each sampling operation, determining a number of text categories based on k to-be-categorized texts extracted through the sampling operation; and determining the number m of text cluster centers based on the number of the text categories corresponding to each of multiple sampling operations; where the k is greater than 1 and less than the number n of to-be-categorized texts in the to-be-categorized text set.

Specifically, in a case where the number of preset text categories is unknown, the number of text categories corresponding to each sampling operation can be determined through multiple sampling operations; for each sampling operation, k to-be-categorized texts are randomly selected from n to-be-categorized texts, k to-be-categorized texts are categorized artificially, and the number of text categories belonging to the k to-be-categorized texts is determined, so that the number of x text categories may be obtained through x sampling operations, and then the number of target categories is obtained by averaging the number of x text categories; then, the number m of text cluster centers is determined based on the number of target categories; for example, the number of target categories may be directly determined as the number m of text cluster centers, or the sum of the number of target categories and the number of preset compensations may be determined as the number m of text cluster centers.

S106, determining a text clustering statistical result based on the above text clustering result; where the above text clustering statistical result includes same-cluster statistical values, the same-cluster statistical values correspond to the to-be-categorized text pairs.

In some example embodiments, if the above text clustering result is obtained by performing a single clustering processing on n to-be-categorized texts, the same-cluster statistical value is able to characterize whether or not the to-be-categorized texts included in the to-be-categorized text pair are clustered into the same text cluster in a single text clustering operation; for example, the same-cluster statistical value may be equal to 0 or 1, 1 indicates that the to-be-categorized texts included in the to-be-categorized text pair are clustered into the same text cluster in a single text clustering operation, and 0 indicates that the to-be-categorized texts included in the to-be-categorized text pair are not clustered into the same text cluster in a single text clustering operation.

In other example embodiments, if the above text clustering result is obtained by performing multiple clustering processing on n to-be-categorized texts, i.e., the above text clustering result includes N text clustering sub-results, then the same-cluster statistical value is used to characterize the probability that the to-be-categorized texts included in the to-be-categorized text pair are clustered into the same text cluster in N text clustering operations;

Specifically, a plurality of to-be-categorized text pairs are constructed based on n to-be-categorized texts in the to-be-categorized text set, and each to-be-categorized text corresponds to a same-cluster statistical value, and each same-cluster statistical value may be a number of same-cluster times of to-be-categorized texts included in a to-be-categorized text pair, i.e., if a certain to-be-categorized text pair includes a to-be-categorized text $T_i$ and a to-be-categorized text $T_j$, then, the same-cluster statistical value of the to-be-categorized text pair refers to the number of text clusters including both the to-be-categorized text $T_i$ and the to-be-categorized text $T_j$ in N text clustering operations, each same-cluster statistical value may also be a proportion of the number of same-cluster times of to-be-categorized texts included in a to-be-categorized text pair (i.e., the quotient of the number of same-cluster times to the total number of times N), where the same-cluster time refers to the number of times that the to-be-categorized texts included in the to-be-categorized text pair are clustered into the same text cluster in the N text clustering operations; where the larger the same-cluster statistical value, the larger the probability that the to-be-categorized texts included in the to-be-categorized text pair are clustered into the same text cluster in N text clustering operations, i.e., the larger the probability that the to-be-categorized texts included in the to-be-categorized text pair belong to the same text category, and therefore, the n to-be-categorized texts may be further textually categorized based on the same-cluster statistical values of the to-be-categorized text pairs.

In addition, in order to improve the accuracy of the same-cluster statistical value, the above same-cluster statistical value can also be a value obtained by normalizing the number of same-cluster times of the to-be-categorized text pairs.

Specifically, the above to-be-categorized text pairs may be obtained by combining n to-be-categorized texts two by two, and there is only one way of combining the two to-be-categorized texts, i.e., the two to-be-categorized texts in the n to-be-categorized texts correspond to one to-be-categorized text pair, correspondingly, the above text clustering statistical result includes the same-cluster statistical values corresponding to each of (n(n−1)/2) to-be-categorized text pairs;

However, in order to present the corresponding relationship between the to-be-categorized text and the same-cluster statistical value more intuitively, so as to make it possible to categorize n to-be-categorized texts more accurately based on the text clustering statistical result, the above text clustering statistical result may be expressed as an n×n matrix, i.e., a text clustering statistical matrix including n×n matrix elements, and each matrix element corresponds to a same-cluster statistical value; where the above to-be-categorized text pair may also be obtained by sorting the to-be-categorized texts in the n to-be-categorized texts two by two (corresponding to n(n−1) to-be-categorized text pairs), or a single to-be-categorized text (corresponding to n to-be-categorized text pairs), and for the to-be-categorized text pair obtained by arranging, since there are two ways of arranging the two to-be-categorized texts, i.e., two to-be-categorized texts in n to-be-categorized texts correspond to two to-be-categorized text pairs, thus, n to-be-categorized texts correspond to n×n to-be-categorized text pairs, and the above text clustering statistical result includes n×n same-cluster statistical values;

Specifically, if a certain to-be-categorized text pair includes a to-be-categorized text $T_i$ and a to-be-categorized text $T_j$, the corresponding same-cluster statistical value may be expressed as $R_{ij}$ or $R_{ji}$, and both i and j are integers greater than 0 and less than or equal to n; where, for $R_{ij}$, i indicates a row number, and j indicates a column number, and for $R_{ji}$, j indicates a row number, and i indicates a column number; and if i equals to j, then the to-be-categorized text pair includes one to-be-categorized text with $R_{ij}$=N, i.e., for a certain to-be-categorized text, it is regarded to be clustered to the same text cluster in each text clustering operation; for example, the to-be-categorized text pair includes one to-be-categorized text $T_1$, $R_{11}$=N, and for example, the to-be-categorized text pair includes a to-be-categorized text $T_2$, $R_{22}$=N; if i is not equal to j, then the to-be-categorized text pair includes two to-be-categorized texts, and $R_{ij}$=$R_{ji}$, for example, the to-be-categorized text pair includes a to-be-categorized text $T_1$ and a to-be-categorized text $T_2$, $R_{12}$=$R_{21}$, $R_{12}$ and $R_{21}$ indicate the probability that the to-be-categorized text $T_1$ and the to-be-categorized text $T_2$ are clustered into the same text cluster in N text clustering operations; for another example, the to-be-categorized text pair includes a to-be-categorized text $T_2$ and a to-be-categorized text $T_3$, and $R_{23}$=$R_{32}$, $R_{23}$ and $R_{32}$ indicate the probability that the to-be-categorized text $T_2$ and the to-be-categorized text $T_3$ are clustered into the same text cluster in N text clustering operations.

S108, categorizing the to-be-categorized text set into a plurality of text categorization subsets based on the same-cluster statistical values of the above to-be-categorized text pairs.

Specifically, since the above text clustering statistical result includes same-cluster statistical values of a plurality of to-be-categorized text pairs, and the same-cluster statistical value can characterize a probability that the to-be-categorized texts included in the to-be-categorized text pair are clustered into the same text cluster in N text clustering operations; considering that if the same-cluster statistical value is greater than a preset threshold, it means that the probability that two to-be-categorized texts in the to-be-categorized text pair belong to the same text category is relatively large; and, if the two same-cluster statistical values are greater than the preset threshold and the corresponding to-be-categorized text pairs include the same to-be-categorized text, then a plurality of to-be-categorized texts included in the to-be-categorized text pairs corresponding to these two same-cluster statistical values belong to the same text category. For example, if the same-cluster statistical values $R_{12}$ and $R_{23}$ are both greater than the preset threshold, it means that the to-be-categorized text $T_1$ and the to-be-categorized text $T_2$ belong to the same text category, and the to-be-categorized text $T_2$ and the to-be-categorized text $T_3$ belong to the same text category, and, if the same-cluster statistical value $R_{34}$ is also greater than the preset threshold, it means that the to-be-categorized text $T_3$ and the to-be-categorized text $T_4$ belong to the same text category, therefore, the to-be-categorized text $T_1$, the to-be-categorized text $T_2$, the to-be-categorized text $T_3$, and the to-be-categorized text $T_4$ belong to the same text category, and therefore, if the same-cluster statistical values $R_{12}$ and $R_{23}$, $R_{34}$ are clustered into a single same-cluster statistical value grouping, and then, the to-be-categorized text $T_1$, the to-be-categorized text $T_2$, the to-be-categorized text $T_3$, and the to-be-categorized text $T_4$ can be categorized into the same text categorization subset based on a plurality of to-be-categorized text pairs corresponding to a plurality of same-cluster statistical values included in this same-cluster statistical value grouping. Based on this, the above plurality of text categorization subsets may be obtained based on the size relationship between each of the same-cluster statistical values in the above text clustering statistical result and the preset threshold and whether the to-be-categorized text pairs corresponding to the two same-cluster statistical values include the same to-be-categorized text; specifically, the plurality of same-cluster statistical values are first divided into a plurality of same-cluster statistical value groupings based on each of the same-cluster statistical values in the above text clustering statistical result; then, the text categorization subset is determined based on the to-be-categorized text pairs corresponding to the plurality of same-cluster statistical values included in each same-cluster statistical value grouping.

In some example embodiments, a plurality of specified same-cluster statistical values greater than a preset threshold may first be screened out based on the above text clustering statistical result, and then, the plurality of specified same-cluster statistical values are divided into a plurality of same-cluster statistical value groupings based on whether the to-be-categorized text pairs corresponding to the plurality of specified same-cluster statistical values include the same to-be-categorized text, thereby a plurality of text categorization subsets are determined. In other example embodiments, if the above text clustering statistical result is a text clustering statistical matrix, a plurality of statistical value tree groupings may first be determined based on the above text clustering statistical matrix, and then the n to-be-categorized texts may be categorized into a plurality of text categorization subsets based on the plurality of statistical value tree groupings.

In embodiments of the present application, a final text categorization result is obtained through performing a preliminary clustering on the to-be-categorized texts in the to-be-categorized text set, and then performing an accurate categorization in combination with a preliminary clustering result, i.e., the process of categorizing a plurality of to-be-categorized texts into a plurality of subsets mainly involves two text processing stages, namely, the text preliminary clustering and the text accurate categorization, not directly taking the text clustering result as the final text categorization result, but first determining the text clustering statistical result based on the text clustering result, and then performing the text categorization based on the text clustering statistical result, which can improve the accuracy of text categorization.

Figure 2:
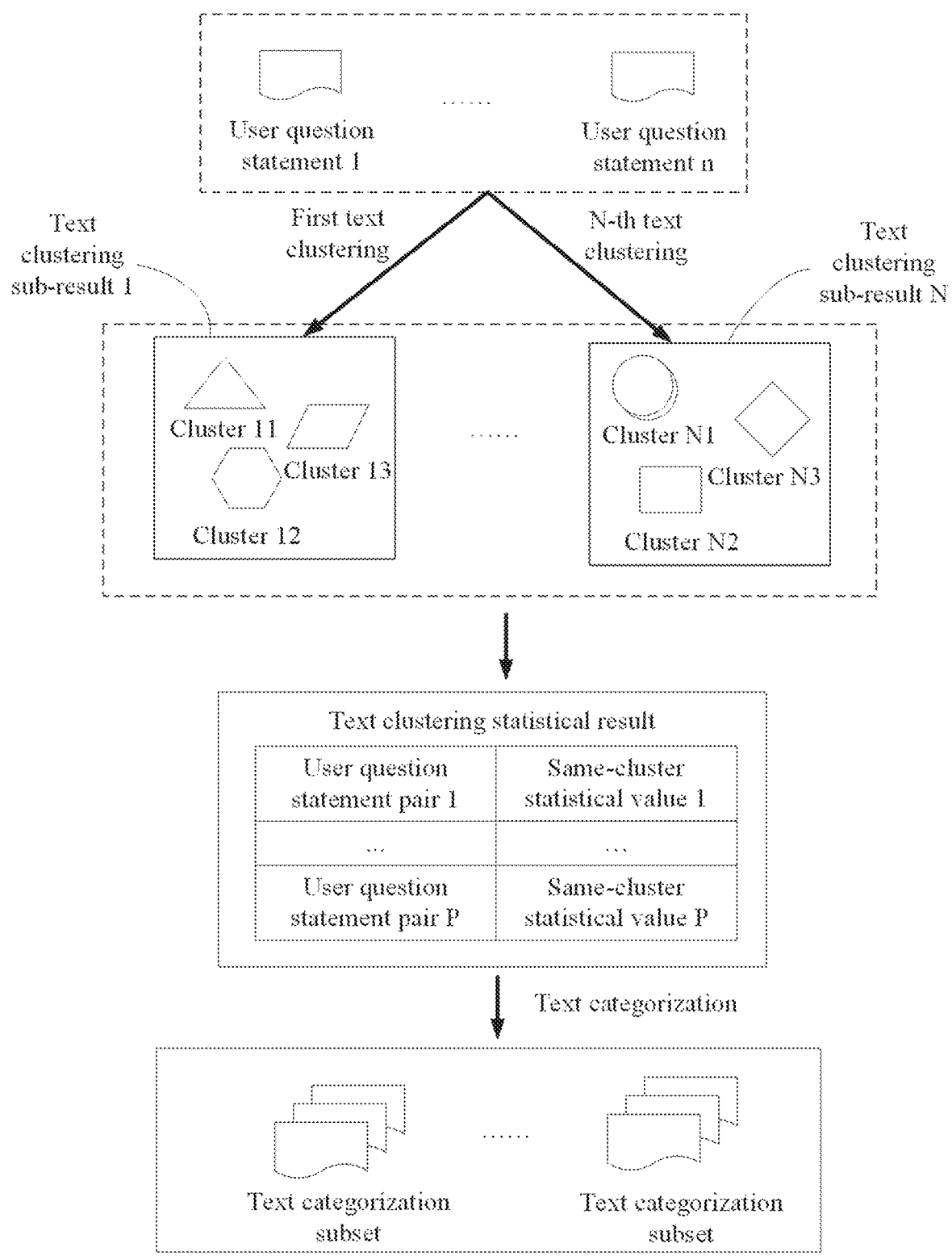
FIG. 2 is a schematic diagram of a first implementation principle of a text categorization method provided in an embodiment of the present application.
Figure 3:
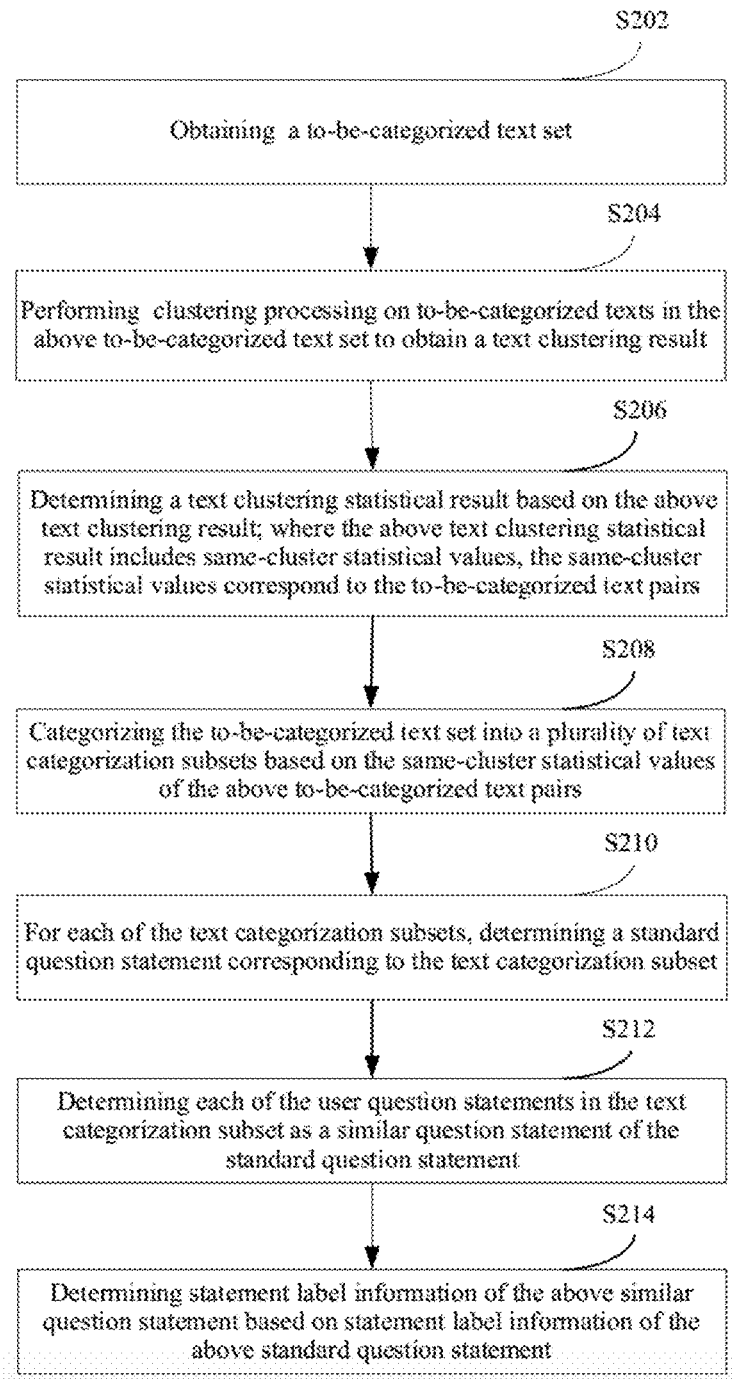
FIG. 3 is a second schematic flowchart of a text categorization method provided in an embodiment of the present application.

In a specific embodiment, taking an example that the above to-be-categorized text set includes n user question statements and the above text clustering result includes N text clustering sub-results, as shown in FIG. 2, a specific implementation process of a text categorization method is given, which mainly includes:

obtaining n to-be-categorized user question statement, for example, user question statement 1 to user question statement n;

performing N times text clustering processing on the above n to-be-categorized user question statements using a preset clustering method to obtain a text clustering sub-result corresponding to each text clustering processing; for example, text clustering sub-result 1 to text clustering sub-result N, each text clustering sub-result includes a plurality of text clusters, for example, the text clustering sub-result 1 includes clusters 11, 12 and 13, and text clustering sub-result N includes clusters N1, N2, N3;

determining the text clustering statistical result based on the above N text clustering sub-results; where the above text clustering statistical result includes the same-cluster statistical values of a plurality of user question statement pairs, and each of the same-cluster statistical values is used to characterize the probability that the user question statements included in the user question statement pair are clustered into the same text cluster in N times text clustering processing; for example, the above text clustering statistical result includes the same-cluster statistical value 1 of the user question statement pair 1 to the same-cluster statistical value P of the user question statement pair P, and a value of P is an integer less than or equal to n×n;

categorizing the n to-be-categorized user question statements into a plurality of text categorization subsets based on the above text clustering statistical result.

Where the above to-be-categorized text is the user question statement extracted from historical interactive data, and the above historical interactive data is generated in the process of information interaction between an agent terminal or customer service terminal and the user terminal within a historical preset time period; correspondingly, reference may be made to S102, S104, S106 and S108 in FIG. 1 for S202, S204, S206 and S208 in FIG. 3, respectively. As shown in FIG. 3, at S208, after categorizing the above to-be-categorized text set into a plurality of text categorization subsets based on the same-cluster statistical values of the above to-be-categorized text pairs, further including:

S210, for each of the text categorization subsets, determining a standard question statement corresponding to the text categorization subset;

S212, determining each of the user question statements in the text categorization subset as a similar question statement of the standard question statement;

S214, determining statement label information of the above similar question statement based on statement label information of the above standard question statement.

Where the above statement label information includes at least one of a standard reply statement, a user intent label, and a true category label. Specifically, for the application scenario of intelligent customer service, after a plurality of text categorization subsets are determined, a text categorization subset corresponding to each standard question statement may be determined based on the preset plurality of standard question statements. In this way, the user question statements included in the text categorization subset can be used as the similar question statements of the corresponding standard question statement, i.e., the effect of expanding the similar question statements of the standard question statement is achieved, and the corresponding relationship between the standard question statement and a plurality of similar question statements is established, therefore, the statement label information of the standard question statement can be determined to be the statement label information of the corresponding similar question statements. For example, if the standard reply statement of the standard question statement is known, then the standard reply statement of the similar question statements corresponding to that standard question statement can be quickly determined. For another example, if the user intent label of the standard question statement is known, then the user intent label of the similar question statements corresponding to that standard question statement can be quickly determined, and thus the user's question can be quickly answered.

Where, for the above process of determining the text clustering statistical result based on the text clustering sub-results obtained from a plurality of text clustering, the above S106 and S206, the determining the text clustering statistical result based on the above text clustering result, specifically includes:

Step 1, for each to-be-categorized text pair, determining a number of same-cluster statistical times of the to-be-categorized text pair based on the above N text clustering sub-results.

Specifically, taking a value of N equal to 5 as an example, the above N text clustering sub-results include a text clustering sub-result 1, a text clustering sub-result 2, a text clustering sub-result 3, a text clustering sub-result 4, and a text clustering sub-result 5, and each of the text clustering sub-results includes a plurality of text clusters; for example, the text clustering sub-result 1 includes a text cluster 11, a text cluster 12, and a text cluster 13. For the to-be-categorized text pair ij, if there respectively is one text cluster that includes both the to-be-categorized text $T_i$ and the to-be-categorized text $T_j$ in the text clustering sub-result 1, the text clustering sub-result 2 and the text clustering sub-result 3, whereas there does not exist one text cluster that includes both the to-be-categorized text $T_i$ and the to-be-categorized text $T_j$ in both the text clustering sub-result 4 and the text clustering sub-result 5, then the number of same-cluster statistical times of the to-be-categorized text pair ij is equal to 3. Assuming that the number of same-cluster statistical times is directly taken as the same-cluster statistical value, $R_{ij}=3$, and so on, the number of same-cluster statistical times of each to-be-categorized text pair is determined, and thus the same-cluster statistical value of each to-be-categorized text pair is determined.

Step 2, determining a text clustering statistical matrix based on the number of same-cluster statistical times of the plurality of to-be-categorized text pairs corresponding to the above n to-be-categorized texts.

Specifically, the number of same-cluster statistical times of each to-be-categorized text pair may be directly used as a same-cluster statistical value, which corresponds to one matrix element, to obtain a text clustering statistical matrix, or the number of same-cluster statistical times of each to-be-categorized text pair may be first normalized, and then the normalized number of same-cluster statistical times may be used as a same-cluster statistical value, which corresponds to one matrix element, to obtain the text clustering statistical matrix.

Step 3, determining the above text clustering statistical matrix as the text clustering statistical result.

Specifically, a schematic diagram of the above text clustering statistical matrix is given in Table 1 below, specifically:

TABLE 1

| $R_{11}$ | $R_{12}$ | $R_{13}$ | ... | $R_{1n}$ |
|---|---|---|---|---|
| $R_{21}$ | $R_{22}$ | $R_{23}$ | ... | $R_{2n}$ |
| $R_{31}$ | $R_{32}$ | $R_{33}$ | ... | $R_{3n}$ |
| ... | ... | ... | ... | ... |
| $R_{n1}$ | $R_{n2}$ | $R_{n3}$ | ... | $R_{nn}$ |

Where, in the above Table 1, $R_{12}$ denotes the same-cluster statistical value of the to-be-categorized text pair 12, the to-be-categorized text pair 12 includes the to-be-categorized text $T_1$ and the to-be-categorized text $T_2$, the to-be-categorized text $T_1$ has a serial number of 1, and the to-be-categorized text $T_2$ has a serial number of 2; corresponding to the to-be-categorized text $T_i$, the row number of $R_{12}$ is 1, and corresponding to the to-be-categorized text $T_2$, the column number of $R_{12}$ is 2, the neighboring same-cluster statistical values of $R_{12}$ are: the same-cluster statistical values $R_{11}$ and $R_{13}$ having the same row number, and the same-cluster statistical value $R_{22}$ having the same column number. For another example, $R_{33}$ denotes the same-cluster statistical value of the to-be-categorized text pair 33, the to-be-categorized text pair 33 includes the to-be-categorized text $T_3$, the to-be-categorized text $T_3$ has a serial number of 3; corresponding to the to-be-categorized text $T_3$, the row number and column number of $R_{33}$ are both 3, the neighboring same-cluster statistical values of $R_{33}$ are: the same-cluster statistical values $R_{32}$ and $R_{34}$ having the same row number, and the same-cluster statistical values $R_{23}$ and $R_{24}$ having the same column number.

In addition, in the above Table 1, n row matrices correspond one-to-one with n to-be-categorized texts, the row matrix with a row number 1 corresponds to the to-be-categorized text $T_1$, the row matrix with a row number 2 corresponds to the to-be-categorized text $T_2$, the row matrix with a row number i corresponds to the to-be-categorized text $T_i$, and the row matrix with a row number n corresponds to the to-be-categorized text $T_n$, and for each of the row matrices, the row numbers of the n same-cluster statistical values in the row matrix are the same, and the to-be-categorized text pairs corresponding to the n same-cluster statistical values includes the same to-be-categorized text, the same to-be-categorized text is a to-be-categorized text included in a to-be-categorized text pair corresponding to a same-cluster statistical value with the same row number and column number;

Similarly, in the above Table 1, the column matrix with a column number 1 corresponds to the to-be-categorized text $T_1$, the column matrix with a column number 2 corresponds to the to-be-categorized text $T_2$, the column matrix with a column number j corresponds to the to-be-categorized text $T_j$, and the column matrix with a column number n corresponds to the to-be-categorized text $T_n$, n column matrices correspond one-to-one with n to-be-categorized texts, and for each of the column matrices, the column numbers of the n same-cluster statistical values in the column matrix are the same, and the to-be-categorized text pairs corresponding to the n same-cluster statistical values include the same to-be-categorized text, the same to-be-categorized text is a to-be-categorized text included in a to-be-categorized text pair corresponding to a same-cluster statistical value with the same row number and column number.

Where, for the above process of performing text categorization based on the text clustering statistical result, the above S108 and S208, the categorizing the to-be-categorized text set into a plurality of text categorization subsets based on the same-cluster statistical values of the above to-be-categorized text pairs, specifically includes:

Step 1, determining a plurality of same-cluster statistical value groupings based on the same-cluster statistical values of the above to-be-categorized text pairs and a first preset constrained condition.

Specifically, the above first preset constrained condition may include any one of the following: the same-cluster statistical value is less than the preset threshold, the serial number of any one of the to-be-categorized text in the to-be-categorized text pair corresponding to the same-cluster statistical value is equal to n and the same-cluster statistical value is less than the preset threshold, and the same-cluster statistical value is a grouped same-cluster statistical value (e.g., set to a specified value or marked as grouped); combining the first preset constrained condition to group a plurality of same-cluster statistical values and obtain a plurality of same-cluster statistical value groupings. Where each of the same-cluster statistical values in the same-cluster statistical value grouping is greater than the preset threshold, and any of the same-cluster statistical values in a same-cluster statistical value grouping includes the same to-be-categorized text as a to-be-categorized text pair corresponding to at least one of the other same-cluster statistical values. That is to say, if the same-cluster statistical values $R_{12}$ and $R_{23}$ are both greater than the preset threshold, it means that the to-be-categorized text $T_1$ and the to-be-categorized text $T_2$ belong to the same text category and the to-be-categorized text $T_2$ and the to-be-categorized text $T_3$ belong to the same text category, then, the to-be-categorized text $T_1$, the to-be-categorized text $T_2$, and the to-be-categorized text $T_3$ belong to the same text category, i.e. because of the to-be-categorized text $T_2$, the same-cluster statistical values $R_{12}$ and $R_{23}$ have transmissibility (it can be understood that if the to-be-categorized text pairs corresponding to the two same-cluster statistical values include a common to-be-categorized text, the two same-cluster statistical values have transmissibility), that is, the to-be-categorized text $T_2$ belongs to the common to-be-categorized text of the to-be-categorized text pairs corresponding to the same-cluster statistical values $R_{12}$ and $R_{23}$, so that the plurality of same-cluster statistical values larger than the preset threshold are concatenated through this common to-be-categorized text. Based on this, the grouping process of the same-cluster statistical values can actually be regarded that a plurality of same-cluster statistical values having a preset transmissibility and greater than a preset threshold are divided into the same same-cluster statistical value grouping, i.e., the same-cluster statistical value grouping includes a plurality of same-cluster statistical values having a preset transmissibility and greater than a preset threshold.

Step 2, for each of the same-cluster statistical value groupings, determining an initial categorization subset corresponding to the same-cluster statistical value grouping based on each of the same-cluster statistical values in the same-cluster statistical value grouping.

Specifically, after determining a plurality of same-cluster statistical value groupings, since it is possible to know which to-be-categorized text is included in a to-be-categorized text pair corresponding to a same-cluster statistical value based on the serial number of each to-be-categorized text in the to-be-categorized text pair corresponding to the same-cluster statistical value, and thus, to-be-categorized texts included in a to-be-categorized text pair corresponding to each same-cluster statistical value in the same-cluster statistical value grouping are categorized into the same initial categorization subset.

Step 3, determining a plurality of text categorization subsets of the above to-be-categorized text set based on the plurality of initial categorization subsets.

Specifically, after determining the initial categorization subsets, the plurality of initial categorization subsets may be directly determined as a plurality of text categorization subsets; or the plurality of initial categorization subsets may be merged based on whether or not the initial categorization subsets include the same categorized text to obtain a plurality of text categorization subsets.

Where considering that the hierarchical relationship between the same-cluster statistical values can be presented more intuitively through the tree structure (i.e., the two same-cluster statistical values whose row number or column number satisfy a preset association relationship correspond to a pair of parent-child nodes), therefore, the above same-cluster statistical value grouping can also be embodied by the tree structure, i.e., the above same-cluster statistical value grouping can be a statistical value tree grouping. Based on this, in order to further improve the efficiency and accuracy of text categorization, the above Step 1, the determining a plurality of same-cluster statistical value groupings based on the same-cluster statistical values of the above to-be-categorized text pair and a first preset constrained condition, specifically includes:

(1) Determining a plurality of statistical value tree groupings based on the same-cluster statistical values of the above to-be-categorized text pair and a second preset constrained condition; where each of the same-cluster statistical values in the above statistical value tree grouping is greater than a preset threshold, the above statistical value tree grouping includes a plurality of statistical value branches, and the row number or column number of any two neighboring same-cluster statistical values on each of statistical value branches satisfies a preset association relationship, and the preset association relationship may include that the row numbers or column numbers of the two same-cluster statistical values are the same, that is, the to-be-categorized text pairs corresponding to the two same-cluster statistical values include the same to-be-categorized text.

Specifically, for the case in which the above same-cluster statistical value grouping is denoted in a tree structure, i.e., the above same-cluster statistical value grouping is a statistical value tree grouping, the above second preset constrained condition may not only include at least one of the following: the same-cluster statistical value is less than the preset threshold, the serial row number or column number of the same-cluster statistical value is equal to n and the same-cluster statistical value is less than the preset threshold, and the same-cluster statistical value is a grouped same-cluster statistical value (e.g., set to a specified value or marked as grouped), and may further include that the target node does not have a first level child node; that is to say, the above second preset constrained condition includes the above first preset constrained condition; the second preset constrained condition is used to constrain a leaf node that determines each statistical value branch, so as to ensure that each same-cluster statistical value on each of statistical value branches is greater than a preset threshold.

Specifically, the plurality of same-cluster statistical values included in the above text clustering statistical result may not be arranged in a matrix form, i.e., the number of plurality of same-cluster statistical values included in the text clustering statistical result is less than n×n, that is to say, the above to-be-categorized text pairs may be obtained by combining n to-be-categorized texts two by two, and there is only one way of combining the two to-be-categorized texts, i.e., the two to-be-categorized texts in the n to-be-categorized texts correspond to one to-be-categorized text pair, correspondingly, the above text clustering statistical result includes the same-cluster statistical values respectively corresponding to (n(n−1)/2) to-be-categorized text pairs. However, in order to present the corresponding relationship between the to-be-categorized text and the same-cluster statistical value more intuitively, so as to make it possible to categorize n to-be-categorized texts more accurately based on the text clustering statistical result, the above text clustering statistical result may be expressed as an n×n matrix, i.e., a text clustering statistical matrix including n×n matrix elements, and each matrix element corresponds to one same-cluster statistical value, that is, the text clustering statistical matrix is constructed based on the same-cluster statistical values of the n×n to-be-categorized text pairs. In this way, based on the text clustering statistical matrix, it can more regularly determine which same-cluster statistical values are divided into a same-cluster statistical value grouping, and realize the grouping of a plurality of same-cluster statistical values to obtain a plurality of same-cluster statistical value groupings. In other words, considering that if the above text clustering statistical result is a text clustering statistical matrix including n×n matrix elements, and each matrix element corresponds to one same-cluster statistical value, then, through using the row number and column number of the same-cluster statistical value, it can be quickly determined whether the to-be-categorized text pairs corresponding to the two same-cluster statistical values include the same to-be-categorized text (i.e., if any one of the row numbers or column numbers of two same-cluster statistical values are the same, for example, two neighboring same-cluster statistical values, it means that they includes the same to-be-categorized text).

(2) Determining a plurality of statistical value tree groupings as a plurality of same-cluster statistical value groupings.

Specifically, for the case where the above text clustering statistical result is a text clustering statistical matrix, for two neighboring matrix elements, the two neighboring matrix elements have the same row number and the difference between the column numbers is 1, or the column numbers are the same and the difference between the row numbers is 1. Where, since if the same-cluster statistical value is greater than the preset threshold, it means that the probability that two to-be-categorized texts in the to-be-categorized text pair belong to the same text category is relatively large, and if any two neighboring same-cluster statistical values on the statistical value branch are neighboring matrix elements, it means that the row numbers or column numbers of the two adjacent same-cluster statistical values are the same; therefore, the to-be-categorized text pairs corresponding to the two neighboring same-cluster statistical values include the same to-be-categorized text, so the probability that a plurality of to-be-categorized texts included in the to-be-categorized text pairs corresponding to the two neighboring same-cluster statistical values belong to the same text category is relatively large. Based on this, firstly, n×n same-cluster statistical values are grouped based on each same-cluster statistical value in the above text clustering statistical matrix to obtain a plurality of statistical value tree groupings; and then, text categorization subsets are determined based on the to-be-categorized text pairs corresponding to the plurality of same-cluster statistical values included in each of the statistical value tree groupings.

For example, if the same-cluster statistical values $R_{12}$, $R_{13}$, $R_{23}$, $R_{24}$ are all greater than a preset threshold, and it is known in conjunction with the above Table 1 that $R_{12}$ and $R_{13}$ are neighboring matrix elements, $R_{13}$ and $R_{23}$ are neighboring matrix elements, and $R_{23}$ and $R_{24}$ are neighboring matrix elements, thus, $R_{12}$, $R_{13}$, $R_{23}$ and $R_{24}$ will be determined as one statistical value branch or part of one statistical value branch, and thus, $R_{12}$, $R_{13}$, $R_{23}$, and $R_{24}$ will be divided into the same statistical value tree grouping; then, the to-be-categorized text $T_1$, the to-be-categorized text $T_2$, the to-be-categorized text $T_3$, and the to-be-categorized text $T_4$ can be categorized into the same text categorization subset based on the to-be-categorized text pairs corresponding to a plurality of same-cluster statistical values included in the statistical value tree grouping. Based on this, the above plurality of text categorization subsets may be determined based on a plurality of statistical value tree groupings, which are obtained based on a size relationship between each of the same-cluster statistical values in the above text clustering statistical result and the preset threshold and whether the two same-cluster statistical values are neighboring matrix elements in the above text clustering statistical matrix.

Correspondingly, the above Step 2, for each of the same-cluster statistical value groupings, determining an initial categorization subset corresponding to the same-cluster statistical value grouping based on each of the same-cluster statistical values in the same-cluster statistical value grouping, specifically includes:

for each of the statistical value tree groupings, determining an initial categorization subset corresponding to the statistical value tree grouping based on each of the same-cluster statistical values in the statistical value tree grouping;

Specifically, after determining a plurality of statistical value tree groupings, since it is possible to know which to-be-categorized text is included in a to-be-categorized text pair corresponding to a same-cluster statistical value based on the row number and column number of the same-cluster statistical value, and thus, to-be-categorized texts included in a to-be-categorized text pair corresponding to each same-cluster statistical value in the statistical value tree grouping are categorized into the same initial categorization subset.

Correspondingly, the above Step 3, the determining a plurality of text categorization subsets of the above to-be-categorized text set based on the plurality of initial categorization subsets, specifically includes:

determining a plurality of text categorization subsets of the above to-be-categorized text set based on the initial categorization subsets respectively corresponding to the above plurality of statistical value tree groupings.

Specifically, after the initial categorization subsets are determined, the plurality of initial categorization subsets may be directly determined as a plurality of text categorization subsets. However, considering that there may be a situation in which the statistical value branch is interrupted due to the fact that a certain same-cluster statistical value is smaller than the preset threshold, for example, for the same-cluster statistical values $R_{11}$, $R_{21}$, $R_{31}$, $R_{41}$, if $R_{11}$, $R_{21}$, $R_{41}$ are all larger than the preset threshold, and $R_{31}$ is smaller than the preset threshold, then $R_{11}$, $R_{21}$ will be divided into one statistical value tree grouping, and $R_{41}$ will be divided into another statistical value tree grouping, but the to-be-categorized text $T_2$ and the to-be-categorized text $T_4$ are all in the same text category as the to-be-categorized text $T_1$, i.e., the to-be-categorized text $T_1$, the to-be-categorized text $T_2$, and the to-be-categorized text $T_4$ belong to the same text category. Therefore, the plurality of initial categorization subsets may be merged based on whether or not the initial categorization subset includes the same categorized text to obtain a plurality of text categorization subsets.

Figure 4:
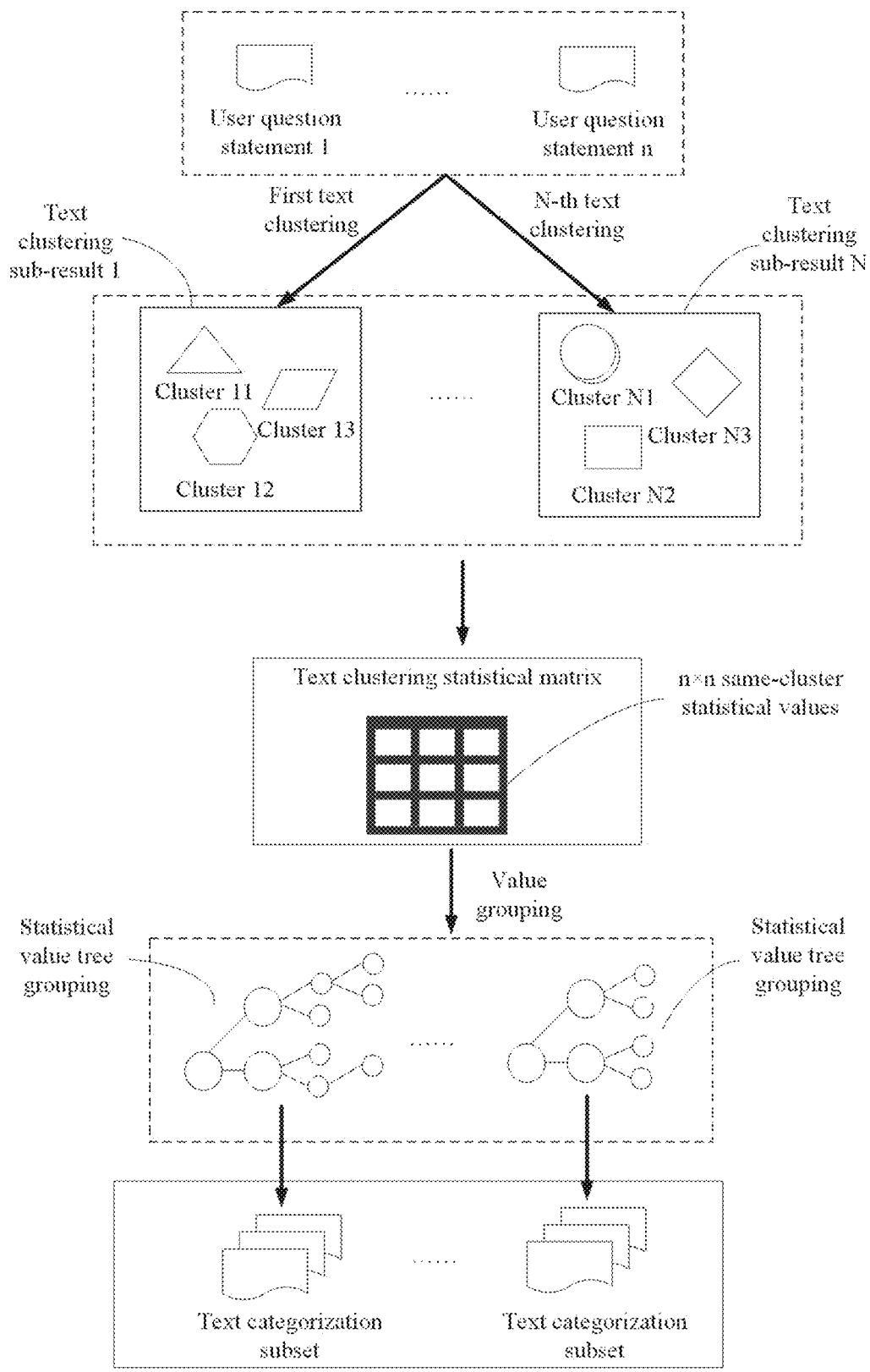
FIG. 4 is a schematic diagram of a second implementation principle of a text categorization method provided in an embodiment of the present application.

In a specific embodiment, taking an example that the above to-be-categorized text set includes n user question statements and the above text clustering result includes N text clustering sub-results, if the above text clustering statistical result includes the text clustering statistical matrix, on the basis of the above FIG. 2, as shown in FIG. 4, a specific implementation process of a text categorization method is given, which mainly includes:

obtaining n to-be-categorized user question statement, for example, user question statement 1 to user question statement n;

performing N times text clustering processing on the above n to-be-categorized user question statements using a preset clustering method to obtain a text clustering sub-result corresponding to each text clustering processing; for example, text clustering sub-result 1 to text clustering sub-result N, each text clustering sub-result includes a plurality of text clusters, for example, the text clustering sub-result 1 includes clusters 11, 12 and 13, and text clustering sub-result N includes clusters N1, N2, N3;

determining the text clustering statistical matrix based on the above N text clustering sub-results; where the above text clustering statistical matrix includes n×n same-cluster statistical values, each of the same-cluster statistical values corresponds to one user question statement pair, i.e., n×n user question statement pairs are determined based on the above n user question statements to be categorized;

performing a numerical grouping on n×n same-cluster statistical values based on the above text clustering statistical matrix to obtain a plurality of statistical value tree groupings; where each of the same-cluster statistical values in the above statistical value tree groupings is greater than the preset threshold, the above statistical value tree grouping includes a plurality of statistical value branches, and any two neighboring same-cluster statistical values on each of the statistical value branches are neighboring matrix elements;

determining a plurality of text categorization subsets corresponding to the n user question statements to be categorized based on each of the same-cluster statistical values in the plurality of statistical value tree groupings.

Where, for the above process (1) determining a plurality of statistical value tree groupings based on the same-cluster statistical values of the above to-be-categorized text pair and a second preset constrained condition, i.e., the process of determining the statistical value tree groupings based on a plurality of same-cluster statistical values in the text clustering statistical result, specifically, each statistical value tree grouping is obtained in the following manner, specifically:

Step A1, selecting one same-cluster statistical value as a root node from a plurality of ungrouped same-cluster statistical values; specifically, the ungrouped same-cluster statistical values do not include the same-cluster statistical value included in a statistical value tree grouping that has been previously determined (i.e., the grouped same-cluster statistical value); the grouped same-cluster statistical value is set to a specified value (e.g., set to zero), and a grouped flag can also be set for the grouped same-cluster statistical value.

Where, for the case where the above text clustering statistical result is the text clustering statistical matrix, one same-cluster statistical value is selected as the root node based on a plurality of ungrouped same-cluster statistical values in the target clustering statistical matrix; the target clustering statistical matrix is the above text clustering statistical matrix or an intermediate clustering statistical matrix, and the intermediate clustering statistical matrix is obtained based on the above text clustering statistical matrix and the statistical value tree grouping that has been previously determined.

Specifically, for the process of determining the first statistical value grouping, the target clustering statistical matrix is the above text clustering statistical matrix, and each of the same-cluster statistical values in the target clustering statistical matrix is the ungrouped same-cluster statistical value, and for the process of determining the non-first statistical value grouping, the target clustering statistical matrix is an intermediate clustering statistical matrix, and except for those same-cluster statistical values included in the statistical value tree grouping that has been previously determined, other same-cluster statistical values in the intermediate clustering statistical matrix are ungrouped same-cluster statistical values. For example, if the statistical value tree grouping that has been previously determined includes the statistical value tree grouping 1 and the statistical value tree grouping 2, then, in the process of determining the statistical value tree grouping 3, the grouped same-cluster statistical values in the used intermediate clustering statistical matrix include the same-cluster statistical values included in the statistical value tree grouping 1 and the statistical value tree grouping 2.

Specifically, the above intermediate clustering statistical matrix may be obtained by setting the grouped same-cluster statistical values in the above text clustering statistical matrix to a specified value (e.g., set to zero), or it may be obtained by setting a grouped flag for a grouped same-cluster statistical value in the above text clustering statistical matrix; where the grouped same-cluster statistical value is a same-cluster statistical value in the statistical value tree grouping that has been previously determined.

Specifically, the above root node may be a same-cluster statistical value randomly selected from a plurality of ungrouped same-cluster statistical values, or may be a same-cluster statistical value selected from a plurality of ungrouped same-cluster statistical values in accordance with a preset selection rule, for example, selecting the same-cluster statistical value with the row number and column number being both minimum from a plurality of ungrouped same-cluster statistical values as the root node, for another example, selecting the same-cluster statistical value with the row number and column number being both maximum from a plurality of ungrouped same-cluster statistical values as the root node.

Step A2, determining at least one first level child node of a target node from the above plurality of ungrouped same-cluster statistical values; where the target node is the root node or a K level child node under the root node, K is an integer greater than 0.

Specifically, for the first target node in a certain statistical value grouping, the target node is the root node, and for the non-first target node in a certain statistical value grouping, the target node is a K-level child node under the root node, e.g., for the second target node, the target node is the first level child node under the root node, i.e., K is equal to 1.

Specifically, the row number or column number of the same-cluster statistical value of the first level child node of the above target node and the row number or column number of the target same-cluster statistical value corresponding to the target node satisfy a preset association relationship, thus, the first level child node of a certain target node may be multiple, e.g., for the case where the above text clustering statistical result is a text clustering statistical matrix, based on the above Table 1, if the target node is the same-cluster statistical value $R_{11}$, then the first level child nodes of the target node include the same-cluster statistical values $R_{21}$, $R_{12}$, i.e., the neighboring matrix elements of the same-cluster statistical value $R_{11}$ are determined.

Step A3, if a same-cluster statistical value of at least one first level child node of the target node does not satisfy the second preset constrained condition, determining the at least one first level child node of the target node as the next target node.

Where, for the case in which the above same-cluster statistical value grouping is denoted in a tree structure, i.e., the above same-cluster statistical value grouping is a statistical value tree grouping, the above second preset constrained condition may include at least one of the following: the same-cluster statistical value is less than the preset threshold, the serial row number or column number of the same-cluster statistical value is equal to n and the same-cluster statistical value is less than the preset threshold, the same-cluster statistical value is a grouped same-cluster statistical value (e.g., set to a specified value or marked as grouped), and the target node does not have a first level child node.

Step A4, if a same-cluster statistical value of at least one first level child node of the target node satisfies the second preset constrained condition, determining the target node as the leaf node, i.e., the statistical value branch in which at least one first level child node of the target node is located is interrupted, and at least one first level child node of the target node is tagged as a terminal node.

Step A5, if the number of at least one first level child node is multiple, and at least one of the same-cluster statistical values of the plurality of first level child nodes of the target node does not satisfy the second preset constrained condition, the first level child node corresponding to a same-cluster statistical value that does not satisfy the second preset constrained condition is determined as the next target node, i.e., the statistical value branch in which the first level child node corresponding to the same-cluster statistical value that satisfies the second preset constrained condition is interrupted, and the first level child node corresponding to the same-cluster statistical value that satisfies the second preset constrained condition is tagged as a terminal node.

Step A6, determining a statistical value tree grouping based on the above root node, the plurality of leaf nodes, and a plurality of child nodes between the above root node and the leaf nodes.

Specifically, the above statistical value tree grouping includes a plurality of statistical value branches, each statistical value branch takes the root node as the starting point and takes the leaf node as the end point, and a first level child node that satisfies the second preset constrained condition is tagged as a terminal node.

Where, for the process of selecting a root node from a plurality of ungrouped same-cluster statistical values, in order to ensure the comprehensiveness of the traversal of the same-cluster statistical values in the text clustering statistical result during the determination process of the first statistical value tree grouping, the same-cluster statistical value with the row number and column number being both minimum or maximum may be selected as the root node from a plurality of ungrouped same-cluster statistical values. Specifically, taking an example of selecting a same-cluster statistical value with the row number and column number being both minimum as the root node, for example, the above step A1, in which a same-cluster statistical value is selected as the root node among a plurality of ungrouped same-cluster statistical values, specifically including:

determining a first ungrouped same-cluster statistical value in the above plurality of ungrouped same-cluster statistical values as the root node, where a row number and a column number of the first ungrouped same-cluster statistical value are both minimum values.

Correspondingly, the above Step A2, determining at least one first level child node of the target node from the above plurality of ungrouped same-cluster statistical values, including:

determining a second ungrouped same-cluster statistical value and/or a third ungrouped same-cluster statistical value in the above plurality of ungrouped same-cluster statistical values as the first level child node; where a row number of the second ungrouped same-cluster statistical value is the same as a row number of a target same-cluster statistical value of the target node, and a difference between a column number of the second ungrouped same-cluster statistical value and a column number of the target same-cluster statistical value is equal to a preset value, a difference between a row number of the third ungrouped same-cluster statistical value and the row number of the target same-cluster statistical value is equal to the preset value, and a column number of the third ungrouped same-cluster statistical value is the same as the column number of the target same-cluster statistical value.

Specifically, for the case where the above text clustering statistical result includes a text clustering statistical matrix, the above preset value may be equal to 1, i.e., the above second ungrouped same-cluster statistical value is a neighboring same-cluster statistical value located to the right of the target same-cluster statistical value corresponding to the target node, and the above third ungrouped same-cluster statistical value is a neighboring same-cluster statistical value located below the target same-cluster statistical value; where, the column number of a neighboring same-cluster statistical value below the target same-cluster statistical value is the same as the column number of the target node, and the difference between their row numbers is 1, and the row number of a neighboring same-cluster statistical value located to the right of the target same-cluster statistical value is the same as the row number of the target node, and the difference between their column numbers is 1.

Specifically, for the process of determining the first statistical value grouping, the same-cluster statistical value Rn is determined as the root node, and if the target node is the root node, at least one first level child node of the target node includes the same-cluster statistical value $R_{12}$ (i.e., a neighboring same-cluster statistical value located to the right of the target same-cluster statistical value) and the same-cluster statistical value $R_{21}$ (i.e., a neighboring same-cluster statistical value located below the target same-cluster statistical value); if the target node is the first level child node of the root node (such as the same-cluster statistical value $R_{12}$), at least one first level child node of the target node includes the same-cluster statistical value $R_{13}$ (i.e., a neighboring same-cluster statistical value located to the right of the target same-cluster statistical value) and the same-cluster statistical value $R_{22}$ (i.e., a neighboring same-cluster statistical value located below the target same-cluster statistical value); if the target node is the first level child node of the root node (such as the same-cluster statistical value $R_{21}$), at least one first level child node of the target node includes the same-cluster statistical value $R_{22}$ (i.e., a neighboring same-cluster statistical value located to the right of the target same-cluster statistical value) and the same-cluster statistical value $R_{31}$ (i.e., a neighboring same-cluster statistical value located below the target same-cluster statistical value).

Figure 5:
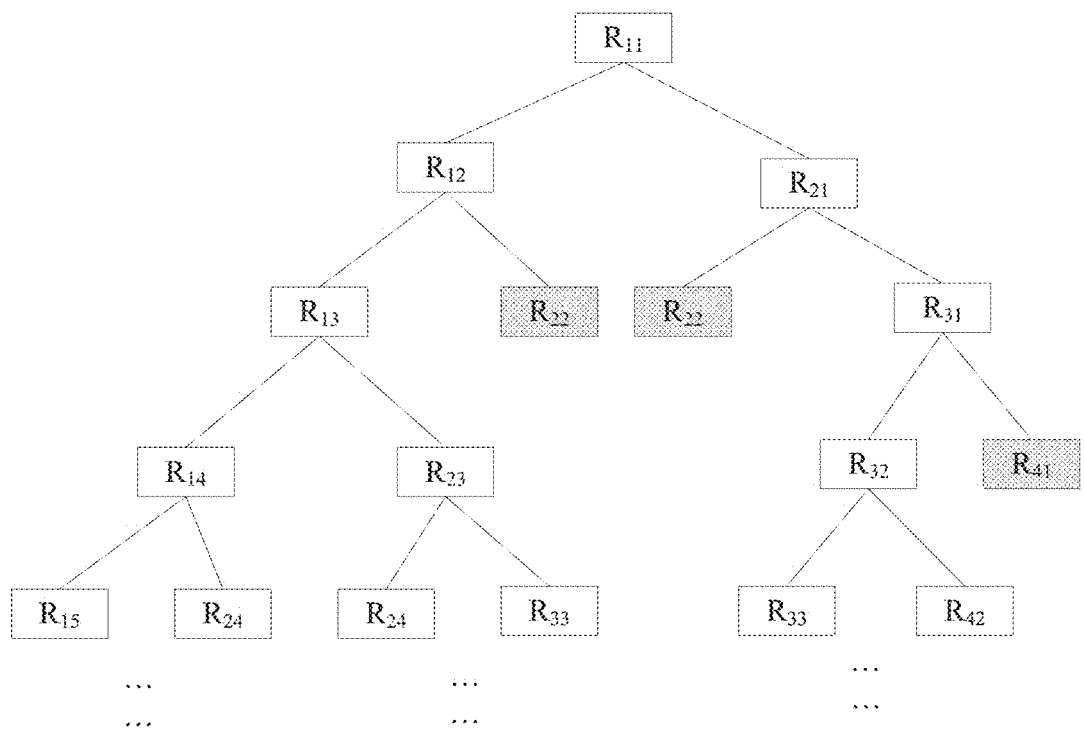
FIG. 5 is a schematic diagram of a third implementation principle of a text categorization method provided in an embodiment of the present application.

In one specific embodiment, if the above text clustering statistical result includes a text clustering statistical matrix, based on the above Table 1, for the determination process of the first statistical value tree grouping, taking an example of the root node being the same-cluster statistical value $R_{11}$, as shown in FIG. 5, a specific implementation process of a text categorization method is given, which mainly includes:

the above target clustering statistical matrix is the text clustering statistical matrix shown in Table 1, and each of the same-cluster statistical values in the text clustering statistical matrix is an ungrouped same-cluster statistical value, selecting the same-cluster statistical value Rn as the root node;

determining at least one first level child node (i.e., R 12 and $R_{21}$) of the current target node Ru from the above text clustering statistical matrix; where $R_{12}$ is a neighboring same-cluster statistical value located to the right of the target same-cluster statistical value $R_{11}$, and $R_{21}$ is a neighboring same-cluster statistical value located below the target same-cluster statistical value $R_{11}$;

if at least one first level child nodes $R_{12}$ and $R_{21}$ of the target node Rn are both greater than a preset threshold (i.e., neither satisfies the second preset constrained condition), determining both $R_{12}$ and $R_{21}$ as the next target nodes;

determining at least one first level child node (i.e., $R_{13}$ and $R_{22}$) of the current target node $R_{12}$ from the above text clustering statistical matrix; where $R_{13}$ is a neighboring same-cluster statistical value located to the right of the target same-cluster statistical value $R_{12}$, and $R_{22}$ is a neighboring same-cluster statistical value located below the target same-cluster statistical value $R_{12}$; and determining at least one first level child node (i.e., $R_{22}$ and $R_{31}$) of the current target node $R_{21}$ from the above text clustering statistical matrix; where $R_{22}$ is a neighboring same-cluster statistical value located to the right of the target same-cluster statistical value $R_{12}$, and $R_{31}$ is a neighboring same-cluster statistical value located below the target same-cluster statistical value $R_{12}$;

if $R_{13}$ is greater than the preset threshold and $R_{22}$ is less than the preset threshold (i.e., $R_{13}$ does not satisfy the second preset constrained condition and $R_{22}$ satisfies the second preset constrained condition) among the two first level child nodes $R_{13}$ and $R_{22}$ of the target node $R_{12}$, determining $R_{13}$ as the next target node, as well as tagging $R_{22}$ as a terminal node, i.e., the statistical value branch in which the first level child node satisfying the second preset constrained condition is interrupted;

if $R_{31}$ is greater than the preset threshold and $R_{22}$ is less than the preset threshold (i.e., $R_{31}$ does not satisfy the second preset constrained condition and $R_{22}$ satisfies the second preset constrained condition) among the two first level child nodes $R_{22}$ and $R_{31}$ of the target node $R_{21}$, determining $R_{31}$ as the next target node, as well as tagging $R_{22}$ as a terminal node, i.e., the statistical value branch in which the first level child node satisfying the second preset constrained condition is interrupted;

determining at least one first level child node (i.e., $R_{14}$ and $R_{23}$) of the current target node $R_{13}$ from the above text clustering statistical matrix; where $R_{14}$ is a neighboring same-cluster statistical value located to the right of the target same-cluster statistical value $R_{13}$, and $R_{23}$ is a neighboring same-cluster statistical value located below the target same-cluster statistical value $R_{13}$; and determining at least one first level child node (i.e., $R_{32}$ and $R_{41}$) of the current target node $R_{31}$ from the above text clustering statistical matrix; where $R_{32}$ is a neighboring same-cluster statistical value located to the right of the target same-cluster statistical value $R_{31}$, and $R_{41}$ is a neighboring same-cluster statistical value located below the target same-cluster statistical value $R_{31}$;

if the two first level child nodes $R_{14}$ and $R_{23}$ of the target node $R_{13}$ are both greater than a preset threshold (i.e., neither satisfies the second preset constrained condition), determining both $R_{14}$ and $R_{23}$ as the next target nodes;

if $R_{32}$ is greater than the preset threshold and $R_{41}$ is less than the preset threshold (i.e., $R_{32}$ does not satisfy the second preset constrained condition and $R_{41}$ satisfies the second preset constrained condition) among the two first level child nodes $R_{32}$ and $R_{41}$ of the target node $R_{31}$, determining $R_{32}$ as the next target node, as well as tagging $R_{41}$ as a terminal node, i.e., the statistical value branch in which the first level child node satisfying the second preset constrained condition is interrupted;

next, sequentially determining at least one first level child node respectively corresponding to the target nodes $R_{14}$, $R_{23}$ and $R_{32}$; where at least one of the first level child nodes of $R_{14}$ is $R_{15}$ and $R_{24}$; at least one of the first level child nodes of $R_{23}$ is $R_{24}$ and $R_{33}$; at least one of the first level child nodes of $R_{32}$ is $R_{33}$ and $R_{42}$; and then, searching for the next target node based on the judgment result of whether $R_{15}$, $R_{24}$, $R_{33}$, $R_{42}$ satisfy the second preset constrained condition, until each of statistical value branches is traversed to the leaf node, to obtain the first statistical value tree groupings.

It is noted that based on a portion of traversal results of the illustration, it is known that the first statistical value tree grouping includes at least $R_{11}$, $R_{12}$, $R_{13}$, $R_{14}$, $R_{15}$, $R_{24}$, $R_{23}$, $R_{33}$, $R_{21}$, $R_{31}$, $R_{32}$, $R_{42}$, and the first statistical value tree grouping does not include the shaded same-cluster statistical values in FIG. 5, i.e., does not include the same-cluster statistical values $R_{22}$ and $R_{41}$. That is to say, since the same-cluster statistical value corresponding to the terminal node is less than the preset threshold, the statistical value tree grouping does not include the terminal node. In addition, for the determination process of the second statistical value tree grouping, the target clustering statistical matrix includes the same-cluster statistical value in the above text clustering statistical matrix except for each of the same-cluster statistical values in the first statistical value tree grouping (i.e., the ungrouped same-cluster statistical value), and the second statistical value tree grouping is obtained by executing the above Steps A1 to A6, and the third statistical value tree grouping is obtained in turn, until n×n same-cluster statistical values are divided into the corresponding statistical value tree groupings; where the determination process of the non-first statistical value tree grouping can be referred to as the determination process of the first statistical value tree grouping, and will not be repeated herein.

Where, for the process of determining a corresponding initial categorization subset based on the same-cluster statistical value groupings, in the above Step 2, determining an initial categorization subset corresponding to the same-cluster statistical value grouping based on each of the same-cluster statistical values in the same-cluster statistical value grouping, specifically includes:

Step B1, determining a row number and a column number of the same-cluster statistical value in the above same-cluster statistical value grouping; specifically, the row number of the same-cluster statistical value corresponds to a serial number of one to-be-categorized text in a to-be-categorized text pair corresponding to the same-cluster statistical value, and the column number of the same-cluster statistical value corresponds to a serial number of another to-be-categorized text in the to-be-categorized text pair corresponding to the same-cluster statistical value.

Step B2, if the above row number and column number are the same, determining a to-be-categorized text corresponding to the row number or the column number as a target categorized text;

Step B3, if the above row number and the column number are different, determining a to-be-categorized text corresponding to the row number and a to-be-categorized text corresponding to the column number as the target categorized text;

Step B4, determining the initial categorization subset corresponding to the above same-cluster statistical value grouping based on the plurality of target categorized texts.

Specifically, taking an example that the above same-cluster statistical value grouping is a statistical value tree grouping, since the row number of the same-cluster statistical value corresponds to a to-be-categorized text, and the column number of the same-cluster statistical value corresponds to a to-be-categorized text, after determining the statistical value tree grouping, each of the same-cluster statistical values in the statistical value tree grouping corresponds to one to-be-categorized text or two to-be-categorized texts; for example, the same-cluster statistical value Rn corresponds to the to-be-categorized text $T_1$, the same-cluster statistical value $R_{21}$ corresponds to the to-be-categorized text $T_1$ and the to-be-categorized text $T_2$. In addition, considering that the to-be-categorized text pair corresponding to the same-cluster statistical values $R_{ij}$ or $R_{ji}$ is same, thus, the same-cluster statistical values corresponding to the same to-be-categorized text pair in the statistical value tree grouping may be de-duplicated first. In addition, also considering that the determined multiple target categorized texts may be duplicated, therefore, it is also necessary to de-duplicate the plurality of target categorized texts to obtain the corresponding initial categorization subsets.

Where, considering that there may be the same target categorized text in a plurality of initial categorization subsets, the initial categorization subsets including the same target categorized text may be merged to obtain the final text categorization subsets, specifically, for the process of determining the final text categorization subset based on the initial categorization subset, the above Step 3, the determining a plurality of text categorization subsets of the above to-be-categorized text set based on the initial categorization subsets respectively corresponding to the above plurality of statistical value tree groupings, specifically including:

Step C1, determining a plurality of categorization subset combinations based on the plurality of initial categorization subsets; where all initial categorization subsets in the above categorization subset combinations include at least one same to-be-categorized text;

Step C2, for each of the categorization subset combinations, finding a union of all initial categorization subsets in the categorization subset combination to obtain a target categorization subset;

Step C3, determining a plurality of text categorization subsets of the to-be-categorized text set based on the plurality of target categorization subsets.

In addition, considering that if the same-cluster statistical value is less than the preset threshold, it means that the semantic difference between the two to-be-categorized texts in the to-be-categorized text pair corresponding to the same-cluster statistical value is relatively large, i.e., they do not belong to the same text category, therefore, if a certain to-be-categorized text or two to-be-categorized text in the to-be-categorized text pair has not been categorized in any one of initial categorization subsets, then this kind of categorized text can be regarded as a noisy text. It is also considered that if the categorized text is categorized into a certain target categorization subset, but the number of the target categorized text included in the target categorization subset is relatively small, such target categorized text may also belong to the noisy text, and therefore, the target categorization subset in which the number of text is less than a preset number threshold may be deleted, and the target categorization subset in which the number of text is greater than or equal to the preset number threshold may be determined as the final text categorization subset.

Figure 6:
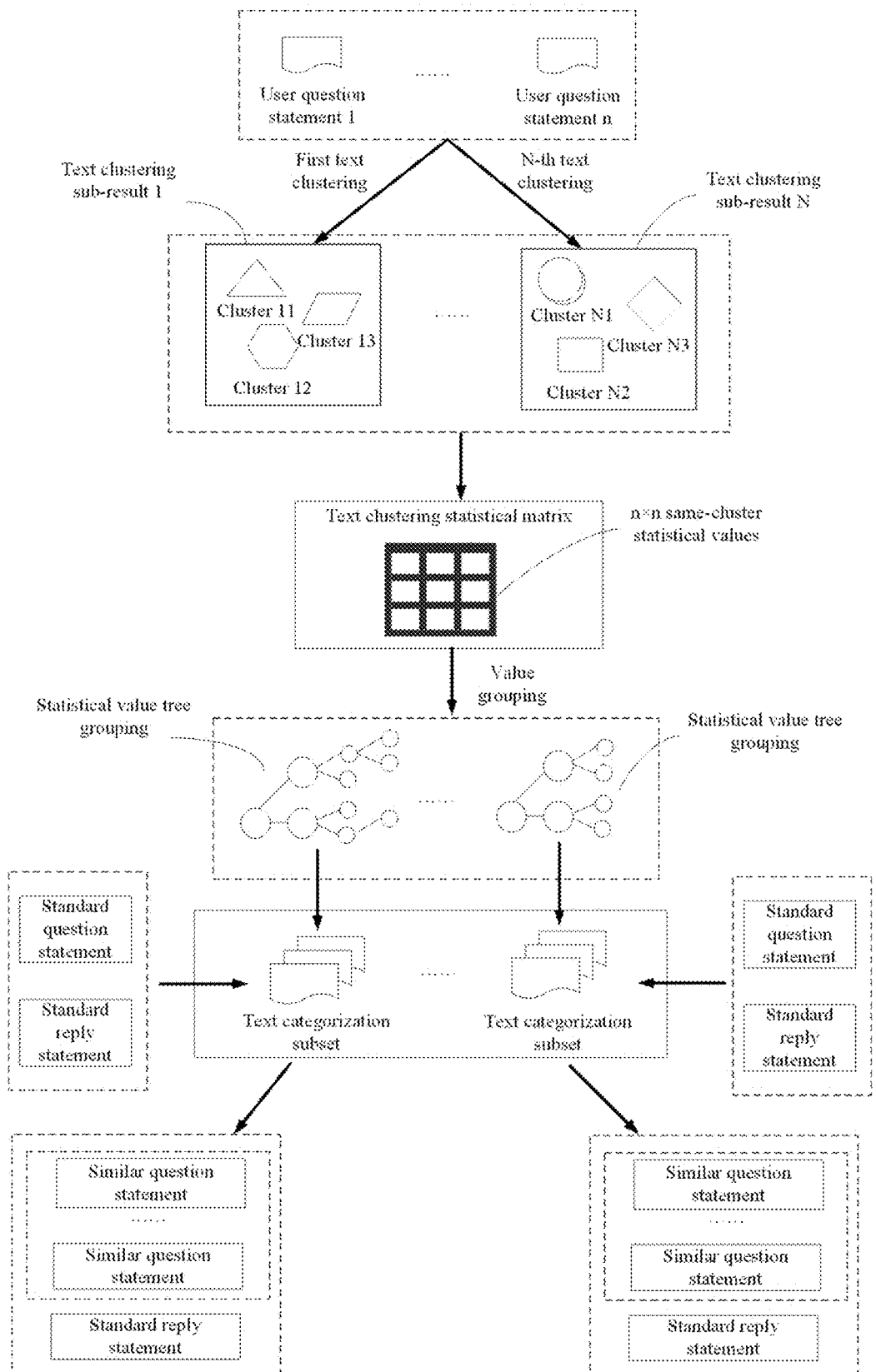
FIG. 6 is a schematic diagram of a fourth implementation principle of a text categorization method provided in an embodiment of the present application.

In a specific embodiment, taking an example that the above to-be-categorized text set includes n user question statements and the above text clustering statistical result includes the text clustering statistical matrix, on the basis of the above FIG. 4, as shown in FIG. 6, a specific implementation process of a text categorization method is given, which mainly includes:

after the determining a plurality of text categorization subsets corresponding to n user question statements to be categorized, for each of the text categorization subsets, determining a standard question statement corresponding to the text categorization subset and a standard reply statement of the standard question statement;

determining each of the user question statements in the above text categorization subset as a similar question statement corresponding to the standard question statement;

determining the standard reply statement of the corresponding similar question statement based on the standard reply statement of the above standard question statement.

In the text categorization method in an embodiment of the present application, after obtaining a to-be-categorized text set, text clustering processing is performed on to-be-categorized texts in the to-be-categorized text set to obtain a text clustering result first; and the text clustering statistical result is determined based on the text clustering result; and then the to-be-categorized text set is categorized into a plurality of text categorization subsets based on the text clustering statistical result; it can be seen that performing a preliminary clustering on the to-be-categorized texts, and then performing an accurate categorization in combination with a preliminary clustering result to obtain a final text categorization result, i.e., the process of categorizing a plurality of to-be-categorized texts into a plurality of subsets involves two text processing stages, namely, the text preliminary clustering and the text accurate categorization, not directly taking the text clustering result as the final text categorization result, but first determining the text clustering statistical result based on the text clustering result, and then performing the text categorization based on the text clustering statistical result, which can improve the accuracy of text categorization. Further, in order to improve the accuracy of the text clustering statistical result, the above text clustering result may include text clustering sub-results obtained from a plurality of text clustering operations, so that since the text clustering statistical result is obtained based on the text clustering sub-results of the plurality of text clustering operations, the accuracy of the text clustering statistical result is ensured, and the accuracy of the text categorization based on the text clustering statistical result can be further improved.

Figure 7:
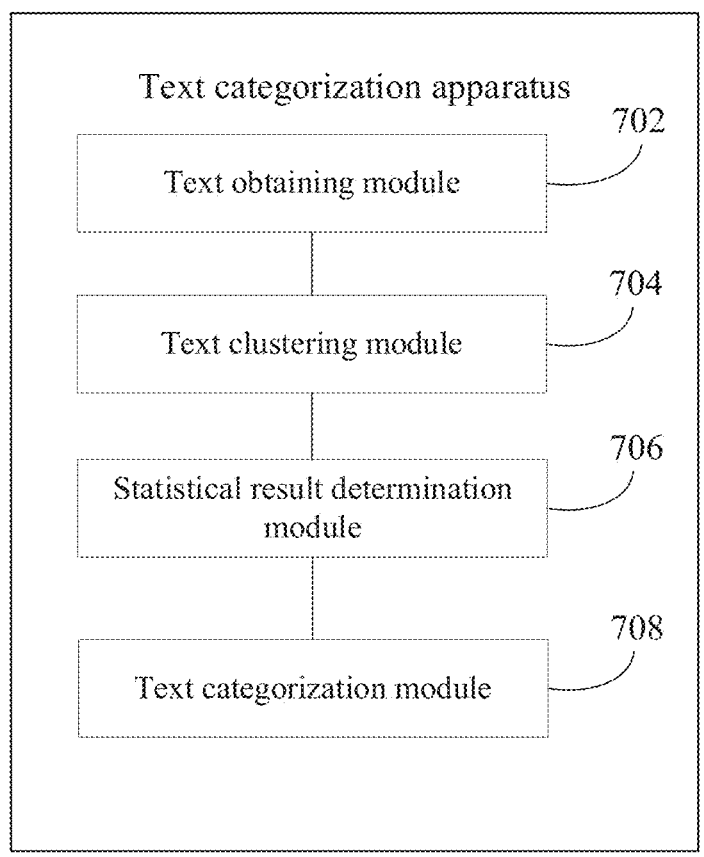
FIG. 7 is a schematic diagram of a module composition of a text categorization apparatus provided in an embodiment of the present application.

Corresponding to the text categorization method described in the above FIGS. 1 to 6, based on the same technical concept, an embodiment of the present application also provides a text categorization apparatus, and FIG. 7 is a schematic diagram of a module composition of a text categorization apparatus provided in an embodiment of the present application, the apparatus is used to perform the text categorization method described in FIGS. 1 to 6, as shown in FIG. 7, the apparatus includes:

a text obtaining module 702, configured to obtain a to-be-categorized text set;

a text clustering module 704, configured to perform clustering processing on to-be-categorized texts in the to-be-categorized text set to obtain a text clustering result;

a statistical result determination module 706, configured to determine a text clustering statistical result based on the text clustering result; where the text clustering statistical result includes same-cluster statistical values, the same-cluster statistical values correspond to the to-be-categorized text pairs;

a text categorization module 708, configured to divide the to-be-categorized text set into a plurality of text categorization subsets based on the same-cluster statistical values.

In the text categorization apparatus in an embodiment of the present application, after obtaining a to-be-categorized text set, text clustering processing is performed on to-be-categorized texts in the to-be-categorized text set to obtain a text clustering result first; and the text clustering statistical result is determined based on the text clustering result; and then the to-be-categorized text set is categorized into a plurality of text categorization subsets based on the text clustering statistical result; it can be seen that performing a preliminary clustering on the to-be-categorized texts, and then performing an accurate categorization in combination with a preliminary clustering result to obtain a final text categorization result, i.e., the process of categorizing a plurality of to-be-categorized texts into a plurality of subsets involves two text processing stages, namely, the text preliminary clustering and the text accurate categorization, not directly taking the text clustering result as the final text categorization result, but first determining the text clustering statistical result based on the text clustering result, and then performing the text categorization based on the text clustering statistical result, which can improve the accuracy of text categorization. Further, in order to improve the accuracy of the text clustering statistical result, the above text clustering result may include text clustering sub-results obtained from a plurality of text clustering operations, so that since the text clustering statistical result is obtained based on the text clustering sub-results of the plurality of text clustering operations, the accuracy of the text clustering statistical result is ensured, and the accuracy of the text categorization based on the text clustering statistical result can be further improved.

It should be noted that the embodiment of the present application regarding the text categorization apparatus and the embodiment of the present application regarding the text categorization method are based on the same inventive concept. Therefore, the specific implementation of this embodiment can be referred to the implementation of the corresponding text categorization method as described above, and any repetition will not be repeated.

Figure 8:
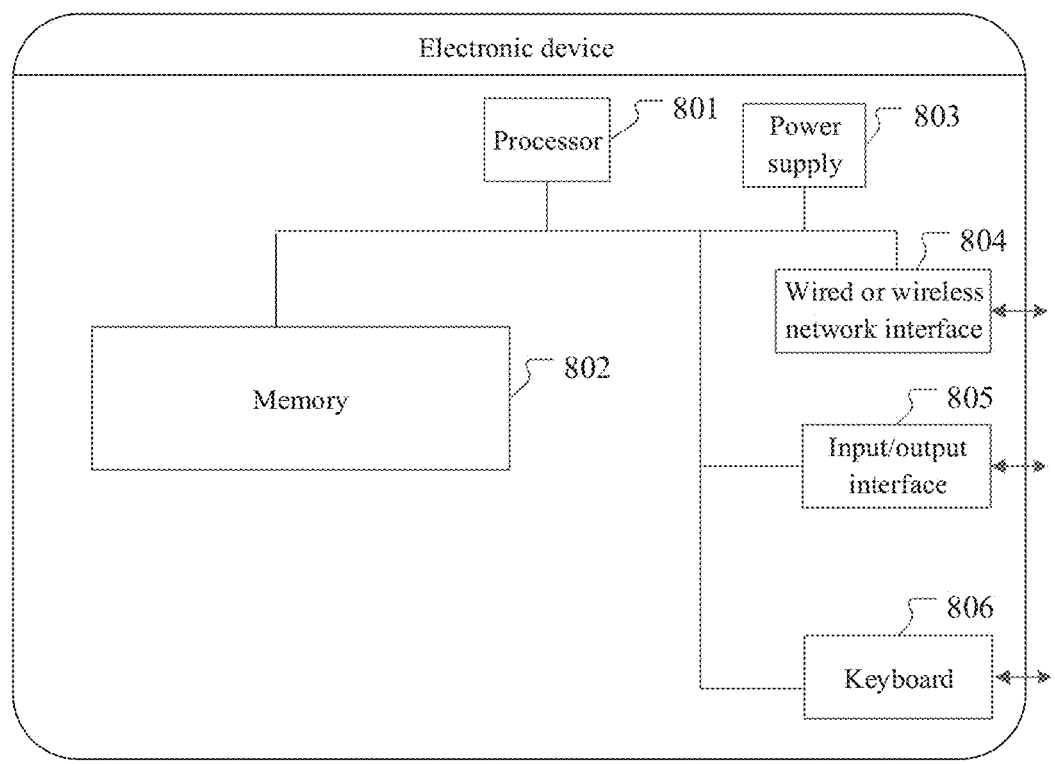
FIG. 8 is a schematic structural diagram of an electronic device provided in an embodiment of the present application.

Further, corresponding to the methods shown in the above FIGS. 1 to 6, based on the same technical concept, an embodiment of the present application also provides an electronic device, which is used to perform the above-described text categorization method, as shown in FIG. 8.

The electronic device, which can have significant differences due to differences in configuration or performance, can include one or more processors 801 and a memory 802, and the memory 802 can store one or more storage application programs or data. Where the memory 802 may be temporary storage or persistent storage. The application program stored in the memory 802 may include one or more modules (not shown in the diagram), each module may include a series of computer executable instructions for the electronic device. Furthermore, the processor 801 can be configured to communicate with the memory 802, and execute a series of computer executable instructions being in the memory 802 on the electronic device. The electronic device may also include one or more power supplies 803, one or more wired or wireless network interfaces 804, one or more input/output interfaces 805, one or more keyboards 806, etc.

In a specific embodiment, the electronic device includes a memory, and one or more programs, where the one or more programs are stored in the memory, and the one or more programs may include one or more modules, and each module may include a series of computer executable instructions for the electronic device and is configured to be executed by one or more processors, the one or more programs include computer executable instructions for performing the following:

obtaining a to-be-categorized text set;
performing clustering processing on to-be-categorized texts in the to-be-categorized text set to obtain a text clustering result;
determining a text clustering statistical result based on the text clustering result; where the text clustering statistical result includes same-cluster statistical values, the same-cluster statistical values correspond to the to-be-categorized text pairs;
categorizing the to-be-categorized text set into a plurality of text categorization subsets based on the same-cluster statistical values.

The electronic device in an embodiment of the present application, after obtaining a to-be-categorized text set, performing text clustering processing on to-be-categorized texts in the to-be-categorized text set to obtain a text clustering result first; and determining the text clustering statistical result based on the text clustering result; and then categorizing the to-be-categorized text set into a plurality of text categorization subsets based on the text clustering statistical result; it can be seen that performing a preliminary clustering on the to-be-categorized texts, and then performing an accurate categorization in combination with a preliminary clustering result to obtain a final text categorization result, i.e., the process of categorizing a plurality of to-be-categorized texts into a plurality of subsets involves two text processing stages, namely, the text preliminary clustering and the text accurate categorization, not directly taking the text clustering result as the final text categorization result, but first determining the text clustering statistical result based on the text clustering result, and then performing the text categorization based on the text clustering statistical result, which can improve the accuracy of text categorization. Further, in order to improve the accuracy of the text clustering statistical result, the above text clustering result may include text clustering sub-results obtained from a plurality of text clustering operations, so that since the text clustering statistical result is obtained based on the text clustering sub-results of the plurality of text clustering operations, the accuracy of the text clustering statistical result is ensured, and the accuracy of the text categorization based on the text clustering statistical result can be further improved.

It should be noted that the embodiment of the present application regarding the electronic device and the embodiment of the present application regarding the text categorization method are based on the same inventive concept. Therefore, the specific implementation of this embodiment can be referred to the implementation of the corresponding text categorization method as described above, and any repetition will not be repeated.

Further, corresponding to the method shown in the above FIGS. 1 to 6, based on the same technical concept, an embodiment of the present application also provides a computer readable storage medium for storing computer executable instructions, and in a specific embodiment, the storage medium may be a USB flash drive, an optical disk, a hard disk, and the like, and the computer executable instructions stored in this storage medium are capable of realizing the following flow when executed by a processor:

obtaining a to-be-categorized text set;
performing clustering processing on to-be-categorized texts in the to-be-categorized text set to obtain a text clustering result;
determining a text clustering statistical result based on the text clustering result; where the text clustering statistical result includes same-cluster statistical values, the same-cluster statistical values correspond to the to-be-categorized text pairs;
categorizing the to-be-categorized text set into a plurality of text categorization subsets based on the same-cluster statistical values.

The computer executable instructions stored in a storage medium in an embodiment of the present application, when which are executed by a processor, after obtaining a to-be-categorized text set, perform text clustering processing on to-be-categorized texts in the to-be-categorized text set to obtain a text clustering result first; and determine the text clustering statistical result based on the text clustering result; and then divide the to-be-categorized text set into a plurality of text categorization subsets based on the text clustering statistical result; it can be seen that performing a preliminary clustering on the to-be-categorized texts, and then performing an accurate categorization in combination with a preliminary clustering result to obtain a final text categorization result, i.e., the process of categorizing a plurality of to-be-categorized texts into a plurality of subsets involves two text processing stages, namely, the text preliminary clustering and the text accurate categorization, not directly taking the text clustering result as the final text categorization result, but first determining the text clustering statistical result based on the text clustering result, and then performing the text categorization based on the text clustering statistical result, which can improve the accuracy of text categorization. Further, in order to improve the accuracy of the text clustering statistical result, the above text clustering result may include text clustering sub-results obtained from a plurality of text clustering operations, so that since the text clustering statistical result is obtained based on the text clustering sub-results of the plurality of text clustering operations, the accuracy of the text clustering statistical result is ensured, and the accuracy of the text categorization based on the text clustering statistical result can be further improved.

It should be noted that the embodiment of the present application regarding the storage medium and the embodiment of the present application regarding the text categorization method are based on the same inventive concept. Therefore, the specific implementation of this embodiment can be referred to the implementation of the corresponding text categorization method as described above, and any repetition will not be repeated.

Specific embodiments of the present application are described above. Other embodiments are within the scope of the appended claims. In some cases, the actions or steps recited in the claims may be performed in a different order than in the embodiments and still achieve the desired results. Further, the processes depicted in the accompanying drawings do not necessarily require a particular sequence or successive sequence shown to achieve the desired results. In some implementations, multitasking and parallel processing are also possible or may be advantageous. It should be appreciated by those skilled in the art that embodiments of the present application may be provided as a method, a system, or a computer program product. Thus, embodiments of the present application may take the form of fully hardware embodiments, fully software embodiments, or embodiments combining software and hardware aspects. Moreover, the present application may take a form of a computer program product implemented on one or more computer readable storage medium (including, but not limited to, a disk memory, a CD-ROM, an optical memory, and the like) including computer-usable program code therein. The present application is described with reference to flowcharts and/or block diagrams of methods, devices (systems), and computer program products according to embodiments of the present application. It is to be understood that each of the flows and/or blocks in the flowcharts and/or block diagrams, and the combination of the flows and/or blocks in the flowcharts and/or block diagrams, may be implemented by computer program instructions. These computer program instructions may be provided to a general-purpose computer, a special-purpose computer, an embedded processor, or a processor of other programmable data processing devices to produce a machine, such that the instructions executed by a computer or a processor of other programmable data processing devices produce an apparatus for achieving a function specified in one or more processes of a flowchart and/or one or more blocks of a block diagram.

These computer program instructions may also be stored in a computer readable memory that can guide a computer or other programmable data processing device to operate in a particular manner, such that the instructions stored in that computer readable memory produce a manufacture including a command apparatus that implements a function specified in one or more processes of a flowchart and/or one or more blocks of a block diagram. These computer program instructions may also be loaded to a computer or other programmable data processing devices, such that a series of operating steps are performed on the computer or other programmable data processing devices to produce computer-implemented processing, thereby, the instructions executed on the computer or other programmable device provide steps for achieving a function specified in one or more processes of a flowchart and/or one or more blocks of a block diagram.

In a typical configuration, a computing device includes one or more processors (CPUs), input/output interfaces, network interfaces, and memory. Memory may include the form of a non-permanent memory in a computer readable medium, a random access memory (RAM) and/or a non-volatile memory, such as a read-only memory (ROM) or a flash memory (flash RAM). Memory is an example of a computer readable medium. The computer readable medium, including a permanent and non-permanent, removable and non-removable media, can be used by any method or technology to implement information storage. The information may be computer readable instructions, data structures, and modules of a program or other data. Examples of storage media of computers include, but are not limited to, a phase-change memory (PRAM), a static random access memory (SRAM), a dynamic random access memory (DRAM), other types of random access memory (RAM), read-only memory (ROM), an electrically erasable programmable read-only memory (EEPROM), a flash memory or other memory technology, a read-only optical disc read-only memory (CD-ROM), a digital versatile disc (DVD) or other optical storage, a magnetic cartridge tape, disk storage or other magnetic storage devices, or any other non-transmission medium for storing information that can be accessed by computing devices. As defined herein, the computer readable media does not include transitory computer-readable media, such as modulated data signals and carriers. It should also be noted that the terms "include", "including" or any other variant thereof are intended to cover non-exclusive inclusion, so that a process, method, commodity or device including a set of elements includes not only those elements, but also other elements that are not explicitly listed or that are inherent to such process, method, commodity or device. Without further limitation, the fact that an element is defined by the phrase "including a . . . " does not exclude the existence of another identical element in the process, method, commodity or device including the element.

The present embodiment can be described in the general context of computer executable instructions executed by a computer, such as program modules. Generally, the program module includes routines, programs, objects, components, data structures, and so on that perform specific tasks or implement specific abstract data types. One or more embodiments of the present application can also be practiced in a distributed computing environment, where tasks are executed by remote processing devices connected through communication networks. In the distributed computing environment, the program module may be located in local and a remote computer storage medium including a storage device. Each embodiment in the present application is described in a progressive manner, and it is sufficient to refer to each embodiment for the same and similar parts of each embodiment, and each embodiment focuses on the differences with other embodiments. In particular, for the system embodiments, since they are substantially similar to the method embodiments, the description is relatively simple, and it is sufficient to refer to the partial description of the method embodiments where relevant. The foregoing are merely embodiments of this document and is not intended to limit this document. Various changes and variations of this document are possible for those skilled in the art. Any modifications, equivalent substitutions, improvements, etc., made within the spirit and principles of this document shall be included within the scope of the claims herein.

What is claimed is:

1. A text categorization method, comprising:
   obtaining a first text set, wherein the first text set comprises a plurality of text pairs, and each text pair comprises at least one text, wherein texts in the plurality of text pairs comprise user question statements extracted from historical interactive data, and the historical interactive data is generated in an interactive process between a user terminal and an agent terminal or between a user terminal and an intelligent customer service;
   performing multiple clustering on the texts in the plurality of text pairs, and obtaining a second text set in each clustering;
   for each text pair, calculating a clustering probability that all the texts in each text pair are clustered into the same second text set in the multiple clustering; and
   categorizing the first text set into a plurality of third text sets based on the clustering probability of each text pair.

2. The text categorization method according to claim 1, wherein the categorizing the first text set into the plurality of third text sets based on the clustering probability of each text pair comprises:
   grouping a plurality of clustering probabilities based on the clustering probabilities of the plurality of text pairs and a first preset constrained condition to obtain a plurality of probability sets;
   determining the second text set corresponding to each clustering probability in each probability set according to the plurality of probability sets; and
   for each probability set, determining the third text set based on the second text sets corresponding to all clustering probabilities in each probability set.

3. The text categorization method according to claim 2, wherein the grouping the plurality of clustering probabilities based on the clustering probabilities of the plurality of text pairs and the first preset constrained condition to obtain the plurality of probability sets comprises: tree grouping the plurality of clustering probabilities based on the clustering probabilities of the plurality of text pairs and a second preset constrained condition to obtain a plurality of tree structures, wherein each of the tree structures corresponds to one of the plurality of probability sets.

4. The text categorization method according to claim 3, wherein the tree grouping the plurality of clustering probabilities based on the clustering probabilities of the plurality of text pairs and the second preset constrained condition to obtain the plurality of tree structures comprises:
   selecting one clustering probability as a root node;
   determining a child node according to the clustering probabilities of the plurality of text pairs and the second preset constrained condition; and
   determining each of the plurality of tree structures based on the root node and the child node.

5. The text categorization method according to claim 4, wherein the determining the child node according to the clustering probabilities of the plurality of text pairs and the second preset constrained condition comprises:
   for the clustering probability of each text pair, in response to a row number of the clustering probability is the same as a row number of a clustering probability corresponding to the root node, and a difference between a column number of the clustering probability and a column number of the clustering probability corresponding to the root node is equal to a preset value, or in response to a difference between the row number of the clustering probability and the row number of the clustering probability corresponding to the root node is equal to the preset value, and the column number of the clustering probability is the same as the column number of the clustering probability corresponding to the root node, determining the clustering probability as the child node.

6. The text categorization method according to claim 2, wherein the determining the second text set corresponding to each clustering probability in each probability set according to the plurality of probability sets comprises:
   determining a row number and a column number of each clustering probability in the probability set;
   if the row number and the column number of the clustering probability are the same, determining a text corresponding to the row number or the column number as a target text;
   if the row number and the column number of the clustering probability are different, determining a text corresponding to the row number and a text corresponding to the column number as the target text; and
   determining the second text set corresponding to each clustering probability in each probability set based on a plurality of target texts.

7. The text categorization method according to claim 2, wherein for each probability set, the determining the third text set based on the second text sets corresponding to all clustering probabilities in the probability set comprises:
   in response to the plurality of second text sets including at least one identical text, finding a union of the texts in the plurality of second text sets to obtain the third text set.

8. A text categorization apparatus, comprising:
   a processor; and
   a memory, arranged to store computer executable instructions, wherein the computer executable instructions are configured to be executed by the processor, the computer executable instructions are used to perform the following steps:
   obtaining a first text set, wherein the first text set comprises a plurality of text pairs, and each text pair comprises at least one text, wherein texts in the plurality of text pairs comprise user question statements extracted from historical interactive data, and the historical interactive data is generated in an interactive process between a user terminal and an agent terminal or between a user terminal and an intelligent customer service;

performing multiple clustering on the texts in the plurality of text pairs, and obtaining a second text set in each clustering;

for each text pair, calculating a clustering probability that all the texts in each text pair are clustered into the same second text set in the multiple clustering; and categorizing the first text set into a plurality of third text sets based on the clustering probability of each text pair.

9. The text categorization apparatus according to claim 8, wherein when the computer executable instructions are executed by the processor, the following steps are specifically performed:

grouping a plurality of clustering probabilities based on the clustering probabilities of the plurality of text pairs and a first preset constrained condition to obtain a plurality of probability sets;

determining the second text set corresponding to each clustering probability in each probability set according to the plurality of probability sets; and for each probability set, determining the third text set based on the second text sets corresponding to all clustering probabilities in each probability set.

10. The text categorization apparatus according to claim 9, wherein when the computer executable instructions are executed by the processor, the following steps are specifically performed:

tree grouping the plurality of clustering probabilities based on the clustering probabilities of the plurality of text pairs and a second preset constrained condition to obtain a plurality of tree structures, wherein the plurality of tree structures correspond to the plurality of probability sets one-by-one.

11. The text categorization apparatus according to claim 10, wherein when the computer executable instructions are executed by the processor, the following steps are specifically performed:

selecting one clustering probability as a root node;

determining a child node according to the clustering probabilities of the plurality of text pairs and the second preset constrained condition; and determining the each of the plurality of tree structures based on the root node and the child node.

12. The text categorization apparatus according to claim 11, wherein when the computer executable instructions are executed by the processor, the following steps are specifically performed:

for the clustering probability of each text pair, in response to a row number of the clustering probability is the same as a row number of a clustering probability corresponding to the root node, and a difference between a column number of the clustering probability and a column number of the clustering probability corresponding to the root node is equal to a preset value, or in response to a difference between the row number of the clustering probability and the row number of the clustering probability corresponding to the root node is equal to the preset value, and the column number of the clustering probability is the same as the column number of the clustering probability corresponding to the root node, determining the clustering probability as the child node.

13. The text categorization apparatus according to claim 9, wherein when the computer executable instructions are executed by the processor, the following steps are specifically performed:

determining a row number and a column number of each clustering probability in the probability set;

if the row number and the column number of the clustering probability are the same, determining a text corresponding to the row number or the column number as a target text;

if the row number and the column number of the clustering probability are different, determining a text corresponding to the row number and a text corresponding to the column number as the target text; and determining the second text set corresponding to each clustering probability in each probability set based on a plurality of target texts.

14. The text categorization apparatus according to claim 9, wherein when the computer executable instructions are executed by the processor, the following steps are specifically performed:

in response to the plurality of second text sets including at least one identical text, finding a union of the texts in the plurality of second text sets to obtain the third text set.

15. A non-transitory computer readable storage medium, wherein the non-transitory computer readable storage medium is configured to store computer executable instructions, the computer executable instructions enable a computer to perform the following steps:

obtaining a first text set, wherein the first text set comprises a plurality of text pairs, and each text pair comprises at least one text, wherein texts in the plurality of text pairs comprise user question statements extracted from historical interactive data, and the historical interactive data is generated in an interactive process between a user terminal and an agent terminal or between a user terminal and an intelligent customer service;

performing multiple clustering on the texts in the plurality of text pairs, and obtaining a second text set in each clustering;

for each text pair, calculating a clustering probability that all the texts in each text pair are clustered into the same second text set in the multiple clustering; and categorizing the first text set into a plurality of third text sets based on the clustering probability of each text pair.

16. The non-transitory computer readable storage medium according to claim 15, wherein the computer executable instructions specifically enable the computer to perform the following steps:

grouping a plurality of clustering probabilities based on the clustering probabilities of the plurality of text pairs and a first preset constrained condition to obtain a plurality of probability sets;

determining the second text set corresponding to each clustering probability in each probability set according to the plurality of probability sets; and for each probability set, determining the third text set based on the second text sets corresponding to all clustering probabilities in each probability set.

17. The non-transitory computer readable storage medium according to claim 16, wherein the computer executable instructions specifically enable the computer to perform the following steps:

tree grouping the plurality of clustering probabilities based on the clustering probabilities of the plurality of text pairs and a second preset constrained condition to obtain a plurality of tree structures, wherein the plurality of tree structures correspond to the plurality of probability sets one-by-one.

18. The non-transitory computer readable storage medium according to claim 17, wherein the computer executable instructions specifically enable the computer to perform the following steps:
selecting one clustering probability as a root node;
determining a child node according to the clustering probabilities of the plurality of text pairs and the second preset constrained condition; and
determining each of the plurality of tree structures based on the root node and the child node.

19. The non-transitory computer readable storage medium according to claim 18, wherein the computer executable instructions specifically enable the computer to perform the following steps:
for the clustering probability of each text pair, in response to a row number of the clustering probability is the same as a row number of a clustering probability corresponding to the root node, and a difference between a column number of the clustering probability and a column number of the clustering probability corresponding to the root node is equal to a preset value, or in response to a difference between the row number of the clustering probability and the row number of the clustering probability corresponding to the root node is equal to the preset value, and the column number of the clustering probability is the same as the column number of the clustering probability corresponding to the root node, determining the clustering probability as the child node.

20. The text categorization method according to claim 1, wherein the text categorization method further comprises:
for each third text set:
determining a standard question statement corresponding to each third text set;
determining user question statements in each third text set as similar question statements of the standard question statement; and
determining statement label information of the similar question statements based on statement label information of the standard question statement, wherein the statement label information comprises at least one of a standard reply statement, a user intent label, and a true category label.

* * * * *